United States Patent
Sun et al.

(10) Patent No.: US 7,616,698 B2
(45) Date of Patent: Nov. 10, 2009

(54) MULTIPLE-INPUT MULTIPLE OUTPUT SYSTEM AND METHOD

(75) Inventors: Qinfang Sun, Cupertino, CA (US); Won-Joon Choi, Sunnyvale, CA (US); Jeffrey M. Gilbert, Sunnyvale, CA (US); Ardavan Maleki Tehrani, Menlo Park, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 662 days.

(21) Appl. No.: 10/981,145

(22) Filed: Nov. 3, 2004

(65) Prior Publication Data

US 2005/0152314 A1 Jul. 14, 2005

Related U.S. Application Data

(60) Provisional application No. 60/563,775, filed on Apr. 19, 2004, provisional application No. 60/517,445, filed on Nov. 4, 2003.

(51) Int. Cl.
*H04B 7/02* (2006.01)
(52) U.S. Cl. ........................ 375/267; 375/299
(58) Field of Classification Search ........... 375/260, 375/267, 340, 299
See application file for complete search history.

(56) References Cited

U.S. PATENT DOCUMENTS

| | | | |
|---|---|---|---|
| 6,061,327 A | 5/2000 | Demoulin et al. | |
| 6,141,332 A | 10/2000 | Lavean | |
| 6,144,711 A | 11/2000 | Raleigh et al. | |
| 6,181,754 B1 | 1/2001 | Chen | |
| 6,219,341 B1 | 4/2001 | Varanasi | |
| 6,314,147 B1 | 11/2001 | Liang et al. | |
| 6,349,272 B1 | 2/2002 | Phillips | |
| 6,362,781 B1 | 3/2002 | Thomas et al. | |
| 6,377,631 B1 | 4/2002 | Raleigh | |
| 6,377,636 B1 | 4/2002 | Paulraj et al. | |
| 6,380,910 B1 | 4/2002 | Moustakas et al. | |
| 6,396,885 B1 | 5/2002 | Ding et al. | |
| 6,426,723 B1 | 7/2002 | Smith et al. | |
| 6,452,981 B1 | 9/2002 | Raleigh et al. | |
| 6,463,099 B1 | 10/2002 | Cao et al. | |
| 6,473,467 B1 | 10/2002 | Wallace et al. | |
| 6,493,331 B1 | 12/2002 | Walton et al. | |
| 6,493,399 B1 | 12/2002 | Xia et al. | |
| 6,504,506 B1 | 1/2003 | Thomas et al. | |
| 6,504,885 B1 | 1/2003 | Chen | |
| 6,556,173 B1 | 4/2003 | Moustakas et al. | |
| 6,611,231 B2 | 8/2003 | Crilly, Jr. et al. | |
| 6,636,568 B2 | 10/2003 | Kadous | |
| 2001/0033622 A1 | 10/2001 | Jongren et al. | |
| 2001/0036235 A1 | 11/2001 | Kadous | |
| 2001/0048725 A1 | 12/2001 | Hicks et al. | |

(Continued)

*Primary Examiner*—David B Lugo
(74) *Attorney, Agent, or Firm*—Bever, Hoffman & Harms, LLP; Jeanette S. Harms

(57) ABSTRACT

A multiple-input multiple-output (MIMO) system can transmit on multiple antennas simultaneously and receive on multiple antennas simultaneously. Unfortunately, because a legacy 802.11a/g device is not able to decode multiple data streams, such a legacy device may "stomp" on a MIMO packet by transmitting before the transmission of the MIMO packet is complete. Therefore, MIMO systems and methods are provided herein to allow legacy devices to decode the length of a MIMO packet and to restrain from transmitting during that period. These MIMO systems and methods are optimized for efficient transmission of MIMO packets.

1 Claim, 12 Drawing Sheets

U.S. PATENT DOCUMENTS

| | | |
|---|---|---|
| 2001/0053143 A1 | 12/2001 | Li et al. |
| 2002/0027957 A1 | 3/2002 | Paulraj et al. |
| 2002/0027985 A1 | 3/2002 | Rashid-Farrokhi |
| 2002/0039844 A1 | 4/2002 | Lee |
| 2002/0041635 A1 | 4/2002 | Ma et al. |
| 2002/0051433 A1 | 5/2002 | Affes et al. |
| 2002/0056066 A1 | 5/2002 | Gesbert et al. |
| 2002/0062472 A1 | 5/2002 | Medlock et al. |
| 2002/0067309 A1 | 6/2002 | Baker et al. |
| 2002/0068611 A1 | 6/2002 | Kogiantis et al. |
| 2002/0085643 A1 | 7/2002 | Kitchener et al. |
| 2002/0086657 A1 | 7/2002 | Chabas |
| 2002/0094834 A1 | 7/2002 | Baker et al. |
| 2002/0097686 A1 | 7/2002 | Qiu |
| 2002/0101825 A1 | 8/2002 | Beck et al. |
| 2002/0102950 A1 | 8/2002 | Gore et al. |
| 2002/0110101 A1 | 8/2002 | Gopalakrishnan et al. |
| 2002/0111142 A1 | 8/2002 | Klimovitch |
| 2002/0118781 A1 | 8/2002 | Thomas et al. |
| 2002/0119799 A1 | 8/2002 | Moulsley et al. |
| 2002/0122381 A1 | 9/2002 | Wu et al. |
| 2002/0122382 A1 | 9/2002 | Ma et al. |
| 2002/0122383 A1 | 9/2002 | Wu et al. |
| 2002/0122502 A1 | 9/2002 | El-Gamal et al. |
| 2002/0126648 A1 | 9/2002 | Kuchi et al. |
| 2002/0127978 A1 | 9/2002 | Khatri |
| 2002/0131516 A1 | 9/2002 | El-Gamal et al. |
| 2002/0132600 A1 | 9/2002 | Rudrapatna |
| 2002/0136327 A1 | 9/2002 | El-Gamal et al. |
| 2002/0141508 A1 | 10/2002 | El-Gamal et al. |
| 2002/0147953 A1 | 10/2002 | Catreux et al. |
| 2002/0150109 A1 | 10/2002 | Agee |
| 2002/0154705 A1 | 10/2002 | Walton et al. |
| 2002/0158801 A1 | 10/2002 | Crilly et al. |
| 2002/0159431 A1 | 10/2002 | Moulsley et al. |
| 2002/0161538 A1 | 10/2002 | Chevalier et al. |
| 2002/0161560 A1 | 10/2002 | Abe et al. |
| 2002/0163879 A1 | 11/2002 | Li et al. |
| 2002/0165626 A1 | 11/2002 | Hammons et al. |
| 2002/0166092 A1* | 11/2002 | Kyosti et al. .............. 714/752 |
| 2002/0168945 A1 | 11/2002 | Hwang et al. |
| 2002/0173302 A1 | 11/2002 | Baker et al. |
| 2002/0177447 A1 | 11/2002 | Walton et al. |
| 2002/0181390 A1 | 12/2002 | Mody et al. |
| 2002/0181509 A1 | 12/2002 | Mody et al. |
| 2002/0183010 A1 | 12/2002 | Catreux et al. |
| 2002/0191535 A1 | 12/2002 | Sugiyama et al. |
| 2002/0191703 A1 | 12/2002 | Ling et al. |
| 2002/0193146 A1 | 12/2002 | Wallace et al. |
| 2002/0196842 A1 | 12/2002 | Onggosanusi et al. |
| 2003/0002450 A1 | 1/2003 | Jalali et al. |
| 2003/0002568 A1 | 1/2003 | Dabak et al. |
| 2003/0002604 A1 | 1/2003 | Fifield et al. |
| 2003/0003863 A1 | 1/2003 | Thielecke et al. |
| 2003/0003880 A1 | 1/2003 | Ling et al. |
| 2003/0013468 A1 | 1/2003 | Khatri |
| 2003/0016640 A1 | 1/2003 | Onggosanusi et al. |
| 2003/0020651 A1 | 1/2003 | Crilly et al. |
| 2003/0021245 A1 | 1/2003 | Haumonte et al. |
| 2003/0026345 A1 | 2/2003 | Muharemovic et al. |
| 2003/0026349 A1 | 2/2003 | Onggosanusi et al. |
| 2003/0035491 A1 | 2/2003 | Walton et al. |
| 2003/0036359 A1 | 2/2003 | Dent et al. |
| 2003/0043732 A1 | 3/2003 | Walton et al. |
| 2003/0043887 A1 | 3/2003 | Hudson |
| 2003/0043928 A1 | 3/2003 | Ling et al. |
| 2003/0043929 A1 | 3/2003 | Sampath |
| 2003/0048856 A1 | 3/2003 | Ketchum et al. |
| 2003/0048857 A1 | 3/2003 | Onggosanusi et al. |
| 2003/0048861 A1 | 3/2003 | Kung et al. |
| 2003/0050020 A1 | 3/2003 | Erceg et al. |
| 2003/0050069 A1 | 3/2003 | Kogiantis et al. |
| 2003/0050074 A1 | 3/2003 | Kogiantis et al. |
| 2003/0060173 A1 | 3/2003 | Lee et al. |
| 2003/0063654 A1 | 4/2003 | Onggosanusi et al. |
| 2003/0066004 A1 | 4/2003 | Rudrapatna et al. |
| 2003/0067890 A1 | 4/2003 | Goel et al. |
| 2003/0072254 A1 | 4/2003 | Ma et al. |
| 2003/0072255 A1 | 4/2003 | Ma et al. |
| 2003/0072283 A1 | 4/2003 | Varshney et al. |
| 2003/0072285 A1 | 4/2003 | Onggosanusi et al. |
| 2003/0072379 A1 | 4/2003 | Ketchum |
| 2003/0072380 A1 | 4/2003 | Huang |
| 2003/0072382 A1 | 4/2003 | Raleigh et al. |
| 2003/0072395 A1 | 4/2003 | Jia et al. |
| 2003/0072452 A1 | 4/2003 | Mody et al. |
| 2003/0073464 A1 | 4/2003 | Giannakis et al. |
| 2003/0076777 A1 | 4/2003 | Stuber et al. |
| 2003/0076787 A1 | 4/2003 | Katz et al. |
| 2003/0076797 A1 | 4/2003 | Lozano |
| 2003/0076890 A1 | 4/2003 | Hochwald et al. |
| 2003/0076891 A1 | 4/2003 | Won |
| 2003/0076908 A1 | 4/2003 | Huang et al. |
| 2003/0081669 A1 | 5/2003 | Yousef et al. |
| 2003/0083016 A1 | 5/2003 | Evans et al. |
| 2003/0086371 A1 | 5/2003 | Walton et al. |
| 2003/0087673 A1 | 5/2003 | Walton et al. |
| 2003/0095506 A1 | 5/2003 | Jalali et al. |
| 2003/0095508 A1 | 5/2003 | Kadous et al. |
| 2003/0095573 A1 | 5/2003 | Vook et al. |
| 2003/0096636 A1 | 5/2003 | Rudrapatna et al. |
| 2003/0103584 A1 | 6/2003 | Bjerke et al. |
| 2003/0108117 A1 | 6/2003 | Ketchum et al. |
| 2003/0112775 A1 | 6/2003 | Molnar |
| 2003/0112880 A1 | 6/2003 | Walton et al. |
| 2003/0112882 A1 | 6/2003 | Sampath |
| 2003/0112901 A1 | 6/2003 | Gupta |
| 2003/0118031 A1 | 6/2003 | Classon et al. |
| 2003/0123381 A1 | 7/2003 | Zhuang et al. |
| 2003/0123425 A1 | 7/2003 | Walton et al. |
| 2003/0124976 A1 | 7/2003 | Tamaki et al. |
| 2003/0125040 A1 | 7/2003 | Walton et al. |
| 2003/0125090 A1 | 7/2003 | Zeira |
| 2003/0128658 A1 | 7/2003 | Walton et al. |
| 2003/0128678 A1 | 7/2003 | Subrahmanya et al. |
| 2003/0128705 A1 | 7/2003 | Yi et al. |
| 2003/0128769 A1 | 7/2003 | Kim et al. |
| 2003/0128770 A1 | 7/2003 | Chenu-Tournier et al. |
| 2003/0129985 A1 | 7/2003 | Naden et al. |
| 2003/0130003 A1 | 7/2003 | Won |
| 2003/0131124 A1 | 7/2003 | Yi et al. |
| 2003/0139139 A1 | 7/2003 | Onggosanusi et al. |
| 2003/0139194 A1 | 7/2003 | Onggosanusi et al. |
| 2003/0139196 A1 | 7/2003 | Medvedev et al. |
| 2003/0143962 A1 | 7/2003 | Boariu |
| 2003/0147476 A1 | 8/2003 | Ma et al. |
| 2003/0147655 A1 | 8/2003 | Shattil |
| 2003/0153273 A1 | 8/2003 | Ebert et al. |
| 2003/0154435 A1 | 8/2003 | Claussen et al. |
| 2003/0154441 A1 | 8/2003 | Nieminen |
| 2003/0157954 A1 | 8/2003 | Medvedev et al. |
| 2003/0161258 A1 | 8/2003 | Zhang et al. |
| 2003/0161268 A1 | 8/2003 | Larsson et al. |
| 2003/0161282 A1 | 8/2003 | Medvedev et al. |
| 2003/0161410 A1 | 8/2003 | Smith et al. |
| 2003/0161412 A1 | 8/2003 | Niida et al. |
| 2003/0162519 A1 | 8/2003 | Smith et al. |
| 2003/0165183 A1 | 9/2003 | Ketchum |
| 2003/0165189 A1 | 9/2003 | Kadous |
| 2003/0169769 A1 | 9/2003 | Ho et al. |
| 2003/0174669 A1 | 9/2003 | Roh et al. |
| 2003/0174767 A1 | 9/2003 | Fujii et al. |
| 2003/0177154 A1 | 9/2003 | Vrancic |
| 2003/0181170 A1 | 9/2003 | Sim |

| | | | | | | |
|---|---|---|---|---|---|---|
| 2003/0181171 A1 | 9/2003 | Sim et al. | | 2003/0189999 A1 | 10/2003 | Kadous |
| 2003/0185174 A1 | 10/2003 | Currivan et al. | | 2003/0190897 A1 | 10/2003 | Lei et al. |
| 2003/0185192 A1 | 10/2003 | Ozluturk et al. | | 2003/0198282 A1 | 10/2003 | Tujkovic et al. |
| 2003/0185241 A1 | 10/2003 | Lu et al. | | 2003/0199270 A1 | 10/2003 | Hamalainen et al. |
| 2003/0185282 A1 | 10/2003 | Hudson | | 2003/0202460 A1 | 10/2003 | Jung et al. |
| 2003/0185285 A1 | 10/2003 | Talwar | | 2004/0120411 A1 | 6/2004 | Walton et al. |
| 2003/0185295 A1 | 10/2003 | Yousef | | 2005/0232370 A1* | 10/2005 | Trachewsky et al. ........ 375/267 |
| 2003/0185309 A1 | 10/2003 | Pautler et al. | | 2005/0233709 A1* | 10/2005 | Gardner et al. ............. 455/101 |
| 2003/0185310 A1 | 10/2003 | Ketchum et al. | | 2006/0029146 A1 | 2/2006 | Catreux et al. |
| 2003/0186650 A1 | 10/2003 | Liu | | 2007/0230431 A1* | 10/2007 | Driesen et al. ............. 370/345 |
| 2003/0186698 A1 | 10/2003 | Holma et al. | | * cited by examiner | | |

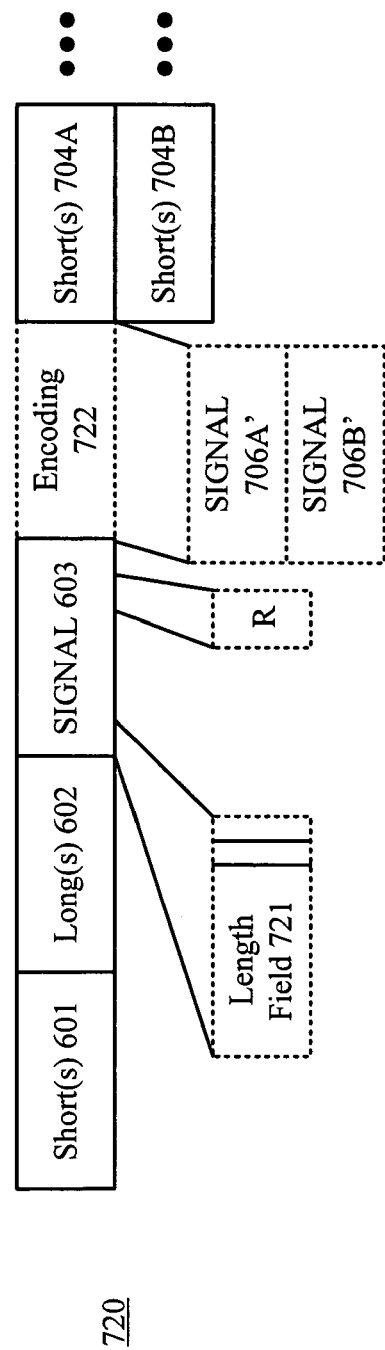

MULTIPLE-INPUT MULTIPLE OUTPUT SYSTEM AND METHOD

RELATED APPLICATIONS

This application claims priority of U.S. Provisional Patent Application 60/517,445, entitled "Method For Multiple Input Multiple Output Systems" filed Nov. 4, 2003 and U.S. Provisional Application 60/563,775, entitled "Method For Multiple Input Multiple Output Systems" filed Apr. 19, 2004.

BACKGROUND OF THE INVENTION

1. Field of the Invention

The present invention relates to a multiple-input multiple-output (MIMO) system and method in a wireless communication environment, and in one embodiment to a MIMO method and system that facilitates backwards compatibility with legacy devices.

2. Description of the Related Art

The design of communication systems for wireless local area networks (WLANs) is based on a family of standards described in IEEE 802.11. For example, the 802.11a specification provides up to 54 Mbps in the 5 GHz band whereas the 802.11g specification also provides up to 54 Mbps but in the 2.4 GHz band. Both the 802.11a/g specifications use an orthogonal frequency division multiplexing (OFDM) encoding scheme.

Notably, the 802.11a/g specifications provide for only one data stream being transmitted or received at any given time. For example, FIG. 1 illustrates a simplified system 100 including a transmitter 101 that can provide a single output at any given time and a receiver 102 that can process a single input at any given time. Thus, system 100 is characterized as a single input single output system.

To address multipath and, more particularly, the fading caused by multipath (wherein objects in the environment can reflect a transmitted wireless signal) and other conditions, a wireless system can employ various techniques. One such technique is switch diversity, wherein transmitters and/or receivers can selectively switch between multiple antennas. For example, FIG. 2 illustrates a simplified system 200 in which transmitter 101 can choose to send signals from antenna 201A or antenna 201B (using a switch 203) whereas receiver 102 can choose to process signals from antenna 202A or antenna 202B (using a switch 204). Thus, system 200 is characterized as a switched diversity antenna configuration.

FIG. 3 illustrates a simplified multiple-input multiple-output (MIMO) system 300, which can transmit on multiple antennas simultaneously and receive on multiple antennas simultaneously. Specifically, a transmitter 301 can transmit signals simultaneously from antenna 302A (using a transmitter chain 303A) and from antenna 302B (using a transmitter chain 303B). Similarly, a receiver 304 can receive signals simultaneously from antenna 305A (using a receiver chain 306A) and from antenna 305B (using a receiver chain 306B).

Note that there are a number of types of MIMO systems. For example, MIMO-AG refers to a MIMO system compatible with both 802.11a and 802.11g. In contrast, MIMO-SM refers to a MIMO system with spatial multiplexing. The use of the acronym "MIMO" hereinafter refers to MIMO-SM.

The use of multiple antennas, depending on the specific implementation, can either extend the range or increase the data rate at a given range. For example, FIG. 4 illustrates the median data rates for various antenna configurations over relative distances. Waveform 401 represents a single antenna configuration; waveform 402 represents a switched diversity antenna configuration; and waveform 403 represents a MIMO antenna configuration. Notably, at any relative distance between 2 and 4, the median data rate for the MIMO antenna configuration is significantly greater than the median data rates for either the single antenna configuration or the switched diversity antenna configuration. For example, at relative distance 3, which represents a top end for a typical home space 404, the median data rate for a MIMO antenna configuration (50 Mbps) is significantly greater than the median data rates for a single antenna configuration (18 Mbps) or even for a switched diversity antenna configuration (33 Mbps).

A MIMO system can also advantageously minimize the differences in signal to noise ratio (SNR) across different frequency bins. For example, FIG. 5 illustrates the SNRs for various antennas across various frequency bins, i.e. SNRs 501 for a first antenna (waveform represented by the dotted line), SNRs 502 for a second antenna (waveform represented by the dashed line), and SNRs 503 for simultaneous usage of the first and second antennas (waveform represented by the solid line). Note that both SNRs 501 and 502 can vary significantly over frequency bins 0-60. In contrast, a MIMO system simultaneously using both the first and second antennas, shown by SNRs 503, can minimize the differences in SNR across different frequency bins (i.e. notches on one channel are compensated for by non-notches in the other channel), thereby allowing more effective compensation for such SNR in the receiver chains and/or transmitter chains.

In MIMO system 300 (FIG. 3), receiver 304 uses multiple chains (i.e. chains 306A and 306B) to receive and decode the multiple data streams (e.g. packets) transmitted by transmitter 301. Unfortunately, because a legacy 802.11a/g device is not able to decode multiple data streams, such a legacy device may "stomp" on a MIMO packet by transmitting before the transmission of the MIMO packet is complete.

Therefore, a need arises for a MIMO system and method that allows legacy devices to decode the length of a MIMO packet and to restrain from transmitting during that period. A further need arises for an efficient way to transmit MIMO packets.

SUMMARY OF THE INVENTION

A multiple-input multiple-output (MIMO) system can transmit on multiple antennas simultaneously and receive on multiple antennas simultaneously. Unfortunately, because a legacy 802.11a/g device is not able to decode multiple data streams, such a legacy device may "stomp" on a MIMO packet by transmitting before the transmission of the MIMO packet is complete. Therefore, MIMO systems and methods are provided herein to allow legacy devices to decode the length of a MIMO packet and to restrain from transmitting during that period. These MIMO systems and methods are optimized for efficient transmission of MIMO packets.

For example, a time-division training pattern for MIMO packets is provided. In this pattern, a first antenna can transmit a short symbol, a first long symbol, and then a legacy SIGNAL symbol. A second antenna can transmit a second long symbol after transmission of the legacy SIGNAL symbol. The first and second antennas can transmit SIGNAL symbols (associated with MIMO data) substantially simultaneously after transmission of the second long symbol.

Another pattern for MIMO packets is provided. In this pattern, a short symbol can be transmitted by a first antenna and a second antenna. The short symbol can be split between a predetermined set of short bins. Notably, the first antenna can be associated with a first set of short bins whereas the second antenna can be associated with a second set of short bins. A long symbol can be transmitted substantially simultaneously by the first and second antennas after transmission of the second short symbol. The long symbol can be associated with a first set of long bins and a second set of long bins. Notably, the first antenna can transmit using the first set of long bins before using the second set of long bins. In contrast, the second antenna can transmit using the second set of long bins before using the first set of long bins. SIGNAL symbols associated with multiple-input multiple-output data can be transmitted substantially simultaneously by the first and second antennas.

In one embodiment, the first set of short bins can include −24, −16, −8, 4, 12, 20 and the second set of short bins can include −20, −12, −4, 8, 16, 24. In another embodiment, the first set of short bins can include −24, −16, −8, 8, 16, 24 and the second set of short bins can include −20, −12, −4, 4, 12, 20.

In one embodiment, the first set of long bins can include −26, −24, . . . −2, 1, 3, . . . 25 and the second set of long bins can include −25, −23, . . . −1, 2, 4, . . . 26. In another embodiment, the first set of long bins can include −26, −24, . . . −2, 2, 4, . . . 26, and the second set of long bins can include −25, −23, . . . −1, 1, 3, . . . 25.

In one embodiment, the pattern can further include computing peak-to-average ratio (PAR) values for at least two split patterns of the short bins and using the split pattern having a lowest PAR value. In another embodiment, the pattern can further include computing peak-to-average ratio (PAR) values for at least two split patterns of the long bins and using the split pattern having an optimized PAR value.

The first and second sets of short bins can use a different frequency shift. For example, if the pattern is using 1 out of every N bins, then a frequency shift pattern can include 1 up to N−1 bins.

In one embodiment, the first antenna can be implemented using a set of antennas. In this case, complex weights can be applied across bins of the first set of antennas, thereby mitigating beam-forming effects. The complex weights include at least one of phase shifts or phase magnitudes, and wherein mitigating beam-forming effects creates a substantially omni-directional transmission.

In one embodiment having a legacy header, the pattern can further include an encoding symbol transmitted after the legacy header to indicate that a MIMO packet is being transmitted. The encoding symbol can indicate at least a number of transmitted data streams. In one embodiment, the encoding symbol can include the SIGNAL symbols associated with MIMO data. These SIGNAL symbols can include flipped pilot tones, wherein the flipped pilot tones are different than that of regular symbols that would otherwise appear in that location.

A method of sending a MIMO packet in a legacy device environment is provided. In this method, a reserved set of bits in a legacy SIGNAL symbol can be set to a predetermined value, thereby indicating a multiple-input multiple-output signal is being transmitted. In another method, a set of bits in the legacy SIGNAL symbol can indicate information associated with a MIMO packet. In one embodiment, the set of bits can include a plurality of least significant bits of a length field of the legacy SIGNAL symbol. The information associated with the MIMO packet could indicate the number of transmitted data streams associated with the MIMO packet. In another method, a 'modulo' operation can be performed on a set of bits in the legacy SIGNAL symbol to indicate information (e.g. the number of streams) associated with the MIMO packet.

A method of tracking and correcting phase variations of multiple received data symbols for a MIMO signal is provided. In this method, a plurality of pilot bins can be inserted into each data symbol. In one embodiment, phase shifting can be added using a pattern across the plurality of pilot bins. For example, the pattern of the phase shifting can be rotated (e.g. cyclically) across the plurality of pilot bins. In one embodiment, four pilot bins can be inserted into each data symbol in a format of [1 1 1 −1]*$p_l$, wherein [1 1 1 −1] is a pattern across the four pilot bins and $p_l$ is a pilot polarity for symbol l.

Another method of tracking and correcting phase variations of multiple received data symbols for a MIMO signal is also provided. In this method, orthogonal patterns can be provided across data streams over any interval of M data symbols long. Providing orthogonal patterns can conform to the equation:

$$\frac{1}{M}\sum_{l=k}^{k+M-1} q_m(l)q_n^*(l) = \delta_{mn},$$

wherein M represents a number of transmitted data streams, m represents a stream, k represents a starting index of M orthogonal data symbols, l represented an index of MIMO symbols, and $\delta_{mn}$ is equal to 1 for m=n or equal to 0 for m≠n. For M transmitted data streams, then a modulating pattern for stream m, wherein $1 \leq m \leq M$ and $l \geq 0$, is $$q_m(l) = e^{j\frac{2\pi}{M}(m-1)l}.$$

A method of joint pilot tracking across streams is provided. In this method, a received signal in each pilot bin can be estimated based on a channel estimation and known pilot patterns. A received signal on a receiver n in pilot K is represented by $$y_{n,k} = \sum_m H_{n,m,k} e^{j\theta} \cdot s_{m,k} + n_{n,k}$$

wherein $s_{m,k}$ is a pilot symbol of stream m, θ is a common phase offset, $H_{n,m,k}$ is a channel response, and $n_{n,k}$ is noise, wherein a common phase offset is represented by $$\theta = \text{angle}\left(\sum_{n,k} y_{n,k} \cdot \left(\sum_m \hat{H}_{n,m,k} s_{m,k}\right)^*\right)$$

wherein $\hat{H}_{n,m,k}$ is the channel estimation.

A method of pilot tracking per transmit chain is provided. In this method, the MIMO detection algorithms can be applied to pilot bins to detect the pilots $\hat{s}_{m,k}$, wherein $\hat{s}_{m,k} \approx s_{m,k} \cdot e^{j\theta_t(m)}$, where $\theta_t(m)$ is a phase offset of stream m. A phase difference can be averaged between decoded pilots and ideal pilots over the pilot bins of each data stream to generate a phase estimate $$\hat{\theta}_t(m) = \text{angle}\left(\sum_k \hat{s}_{m,k} \cdot s_{m,k}^*\right).$$

A method of pilot tracking per transmit/receive chains is provided. This method can include modulating pilot polarity sequences with orthogonal patterns, thereby estimating phase separately for each transmit/receive chain. If a number of transmitted data streams is M, then a modulating pattern for stream m, wherein $1 \leq m \leq M$, can be represented by $$q_m(l) = e^{j\frac{2\pi}{M}(m-1)l},$$

where $l \geq 0$ is the index of the MIMO symbols. The method can further include estimating a phase offset of stream m on a receive antenna n by averaging over a plurality of pilot bins, represented by $$\theta_{n,m} = \text{angle}\left(\sum_k v_{n,m,k}\right) = \text{angle}\left(\sum_k \sum_l y_{n,k}(l) \cdot r^*_{m,k}(l) \cdot H^*_{n,m,k}\right).$$

A method of splitting source data bits to form a MIMO signal is provided. In this method, bits can be added to the source data bits to initialize and terminate an encoder, thereby creating modified source data bits. The modified source data bits can be provided to the encoder, thereby creating encoded source data bits. The encoded source data bits can then be split into N data streams.

Another method of splitting source data bits to form a MIMO signal is provided. In this method, the source data bits can be split into N data streams. Bits can be added to the N data streams to initialize and terminate N encoders, thereby creating N modified data streams. The method can further include selecting a total number of bits such that when split across symbols for each of the N data streams, the number of symbols in each data stream is substantially equal.

Yet another method of splitting source data bits to form a MIMO signal is provided. In this method, bits can be added to source data bits to initialize and terminate an encoder, thereby creating modified source data bits. The modified source data bits can be provided to the encoder, thereby creating encoded source data bits. The encoded source data bits can be provided to a puncturer, thereby creating punctured source data bits. Then, the punctured source data bits can be split into N data streams.

A method of indicating a length of a MIMO packet using a legacy SIGNAL symbol is provided. This legacy SIGNAL symbol can include a rate field and a length field. However, the length of the MIMO packet may be longer than can be represented using the length field. In this case, the method can include using the rate field as well as the length field to represent the length of the MIMO packet. For example, a pseudo-rate value can be provided in the rate field and a pseudo-length value can be provided in the length field. In one embodiment, the pseudo-rate value can be the lowest legacy rate and the pseudo-length value can be an actual legacy length representing a transmit duration. In another embodiment, a MIMO SIGNAL symbol of the MIMO packet includes a relative packet length.

A pattern for MIMO packets is provided. The pattern can include a legacy header and a MIMO header. The legacy header can include a plurality of short symbols for determining automatic gain control for receipt of the legacy header. In contrast, the MIMO header can include a second plurality of short symbols for facilitating automatic gain control for receipt of the MIMO header.

Another pattern for MIMO packets is provided. This pattern can include a first short symbol transmitted by a plurality of antennas. Notably, the first short symbol can be split between a predetermined set of short bins, wherein each of the plurality of antennas can be associated with a subset of the short bins. The first short symbol can be used for automatic gain control for a MIMO packet (the MIMO packet including the first short symbol).

The pattern can further include a first long symbol transmitted substantially simultaneously by the plurality of antennas. Notably, the first long symbol can be associated with sets of long bins, wherein each antenna transmits using a different order of the sets of long bins. The first long symbol can be used for MIMO channel estimation (the MIMO packet further includes a first long symbol).

In one embodiment, the plurality of antennas includes a first and second antennas. In this case, the first and second antennas can transmit the first short symbol after transmission of the legacy SIGNAL symbol. The first antenna can be associated with a first set of short bins whereas the second antenna can be associated with a second set of short bins. The first and second antennas can transmit the first long symbol substantially simultaneously. Notably, the first long symbol can be associated with a first set of long bins and a second set of long bins, wherein the first antenna transmits using the first set of long bins before using the second set of long bins, and the second antenna transmits using the second set of long bins before using the first set of long bins.

The pattern can also include SIGNAL symbols associated with MIMO transmitted substantially simultaneously by the first and second antennas after the first short symbol and the first long symbol. The pattern can further include a second short symbol, a second long symbol, and a legacy SIGNAL symbol. The second short symbol can be used for automatic gain control for a legacy header. The legacy header can include the second short symbol, the second long symbol, and the legacy SIGNAL symbol. Notably, the legacy header is transmitted before the MIMO header.

Yet another pattern for MIMO packets is provided. This pattern can also include a legacy header and a MIMO header. The legacy header can include a first plurality of long symbols used for legacy device channel estimation. The MIMO header can include a second plurality of long symbols used for MIMO device channel estimation.

Yet another pattern for multiple-input multiple-output (MIMO) packets is provided. This pattern can include a first long symbol transmitted by a plurality of antennas. The first long symbol can be transmitted substantially simultaneously by the plurality of antennas. Notably, the first long symbol can be associated with sets of long bins, wherein each antenna transmits using a different order of the sets of long bins. The first long symbol can be used for MIMO channel estimation for a MIMO packet (the MIMO packet including the first long symbol).

This pattern can further include a first short symbol. The first short symbol can also be transmitted by the plurality of antennas. Notably, the first short symbol can be split between a predetermined set of short bins, wherein each of the plurality of antennas is associated with a subset of the short bins. The first short symbol can be used for automatic gain control for the MIMO packet (the MIMO packet including the first short symbol).

In one embodiment, the plurality of antennas can include first and second antennas. The first and second antennas can transmit the first short symbol after transmission of the legacy SIGNAL symbol. The first antenna can be associated with a first set of short bins and the second antenna can be associated with a second set of short bins. The first and second antennas can transmit the first long symbol substantially simultaneously. The first long symbol can be associated with a first set of long bins and a second set of long bins. Notably, the first antenna can transmit using the first set of long bins before using the second set of long bins. In contrast, the second antenna can transmit using the second set of long bins before using the first set of long bins.

The pattern can further include SIGNAL symbols associated with MIMO transmitted substantially simultaneously by the first and second antennas after the first short symbol and the first long symbol.

A method of decoding a plurality of encoded data streams for a MIMO transmission is provided. In this method, for decoding, the data bits from good bins can be weighted more heavily than the data bits from bad bins. For example, the bin weights can be proportional to a signal to noise ratio (SNR) or to a square root of the SNR.

The weighting can influence Viterbi branch metrics computation. In one embodiment, the method can further include determining the impact of error propagation based on the following equations for computing effective noise terms for second and third streams:

$$\tilde{\sigma}_2^2 = \sigma_2^2 + |w_2^x h_1|^2 \cdot \sigma_1^2$$
$$\tilde{\sigma}_3^2 = \sigma_3^2 + |w_3^x h_2|^2 \cdot \tilde{\sigma}_2^2 + |w_3^x h_1|^2 \cdot \sigma_1^2$$

wherein $\sigma_m^2$ is an original noise term, $w_m$ is a nulling vector, $h_m$ is a channel, and $\tilde{\sigma}_m^2$ is an effective noise term for an m-th data stream.

A method for modifying channel corrections for a plurality of receiver chains is provided. In this method, channel estimates for the plurality of receiver chains can be received. Gain adjustment values for the plurality of receiver chains can be computed based on a noise floor and automatic gain control values. Then, the gain adjustment values can be applied to the plurality of receiver chains.

A method of using phase estimates for a MIMO system is provided. In this method, a single joint phase estimate can be used from a plurality of data streams to compute a phase correction applicable to all data streams. In one embodiment, the plurality of data streams includes all data streams.

A method of providing phase estimations for each transmit/receive pair is provided. In this method, a phase offset of each element of a channel matrix H, $\theta_{n,m}(1 \leq m \leq M, 1 \leq n \leq N)$, can be estimated from pilots and converted the phase offset into $\theta_t(m)(1 \leq m \leq M)$ and $\theta_r(n)(1 \leq n \leq N)$. In channel matrix H, $$\begin{bmatrix} 1_N & & & I_N \\ & 1_N & & I_N \\ & & \ddots & \vdots \\ & & & 1_N & I_N \end{bmatrix} \begin{bmatrix} \theta_t(1) \\ \theta_t(2) \\ \vdots \\ \theta_t(M) \\ \theta_r \end{bmatrix} = \begin{bmatrix} \theta_1 \\ \theta_2 \\ \vdots \\ \theta_M \end{bmatrix} \Leftrightarrow A \cdot \Theta_1$$

$$= \Theta_2 \Rightarrow \Theta_1$$
$$= pinv(A) \cdot \Theta_2$$

wherein $1_N$ is an N-by-1 vector of all 1's, $I_N$ is an identity matrix of size N, $\theta_r = [\theta_r(1) \ \theta_r(2) \ldots \theta_r(N)]^T$ is a phase vector at N receivers, and $\theta_m = [\theta_{1,m} \ \theta_{2,m} \ldots \theta_{N,m}]^T$ is a phase vector of an m-th column of matrix H.

A method of optimizing transmission of a MIMO signal is provided. In this method, a quality of a channel can be assessed using a packet received by an intended receiver from a transmitter of the MIMO signal. At this point, a packet (e.g. a CTS packet or an ACK packet) can be sent from the intended receiver to the transmitter, the packet including feedback information for optimizing transmission. This feedback information can be derived from a plurality of data streams previously transmitted substantially simultaneously. For example, the feedback information can include (1) channel estimates or (2) a detection pilot EVM computed from channel corrected pilots and known clean pilots.

In one embodiment, the feedback information can include a data rate to be used by the transmitter. In another embodiment, the feedback information can include an indicator for a minimum data rate, a maximum data rate, a higher data rate, and/or a lower data rate to be used by the transmitter.

A method of optimizing transmission of a transmitted MIMO signal is provided. In this method, a quality of a channel can be assessed using a MIMO packet, the MIMO packet being received by a transmitter for the MIMO signal from an intended receiver. Optimized transmit information can be determined based on the MIMO packet.

A method of determining receiver selection for a MIMO signal in a diversity antenna system is provided. At least one receiver chain is connectable to a plurality of receive antennas. In this method, for each receiver chain, a receive antenna having a strongest signal can be selected.

A method of determining receiver selection for a MIMO signal in a diversity antenna system is also provided. In this method, possible combinations of receive antennas can be determined, wherein at least one receiver chain is connectable to a plurality of receive antennas. The signal to noise (SNR) can be computed for each combination. Then, the combination having a minimum SNR can be selected.

A method of selecting a split sequence is also provided. In this method, the power-to-average ratios (PARs) for a plurality of split sequences can be computed. Then, the split sequence having an optimized PAR can be selected.

The advantages of these MIMO systems and methods will now be described in reference to the following figures.

BRIEF DESCRIPTION OF THE FIGURES

FIG. 7B illustrates an exemplary split short and long symbols for three data streams.

FIG. 7C illustrates the set of bits in the legacy SIGNAL symbol that can be set to indicate a MIMO packet as well as the number of transmitted data streams.

DETAILED DESCRIPTION OF THE FIGURES

Legacy Header and Symbol Splitting

In accordance with one embodiment, a legacy device can be prevented from "stomping" on MIMO signals (i.e. transmitting before the transmission of the MIMO packet is complete) by receiving a backward compatible preamble preceding the MIMO packet. This backward compatible preamble, which is compatible with IEEE 802.11a/g systems, can advantageously allow the legacy device to decode the length of the MIMO packet and restrain from transmitting during that period. Additionally, this preamble can indicate whether the attached packet is a MIMO packet and, if it is, the number of data streams being transmitted.

Figure 6:
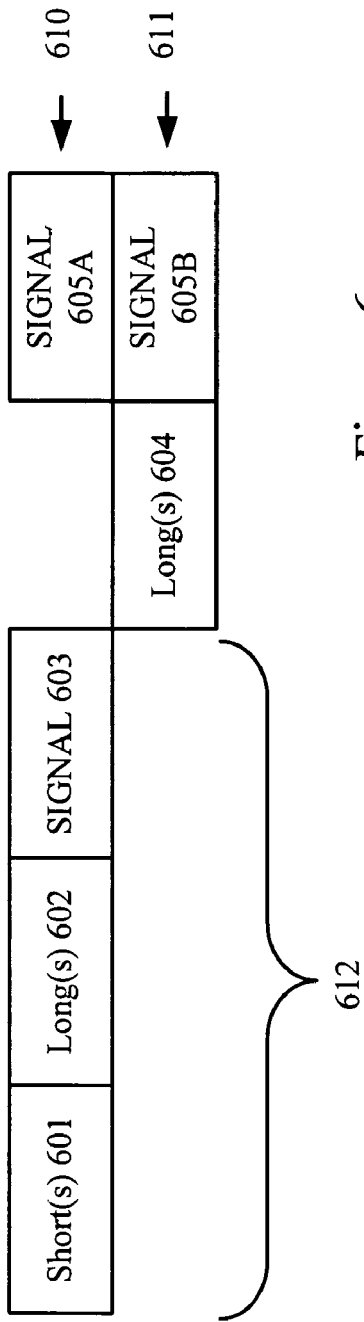
FIG. 6 illustrates an exemplary time-division training pattern for a MIMO packet including a legacy header.

FIG. 6 illustrates an exemplary time-division training pattern 600 for a MIMO packet including this preamble. Specifically, a preamble 612, also called a legacy header herein, can include the standard 802.11a/g short symbol(s), long symbol(s) and SIGNAL symbol(s). Note that subsequent references to these symbols, although in plural form, could refer to either plural or single symbols.

In one embodiment, spatial streams 610 and 611 can be transmitted respectively from two (e.g. first and second) antennas. In other embodiments, spatial stream 610 can be transmitted from a plurality of antennas in a beam-forming antenna configuration. Thus, spatial stream 610 can be characterized as being transmitted by a set of antennas. For convenience, spatial stream 610 is described as being transmitted by a first antenna whereas spatial stream 611 is described as being transmitted by a second antenna.

In legacy header 612, short symbols 601 can be used for coarse ppm estimation and timing. Long symbols 602 transmitted from the first antenna can be used to estimate the channel from the first antenna. Notably, in one embodiment, SIGNAL symbol 603 can advantageously include the length information for the MIMO packet, thereby preventing a legacy device from stomping on the MIMO packet. Long symbols 604, which are transmitted from the second antenna but otherwise identical to long symbols 602, can be used to estimate the channel from the second antenna. SIGNAL symbols 605A and 605B can include information regarding the modulation and length of the MIMO portions of spatial streams 610 and 611, respectively (wherein the MIMO portions are those portions after legacy header 612).

Figure 7A:
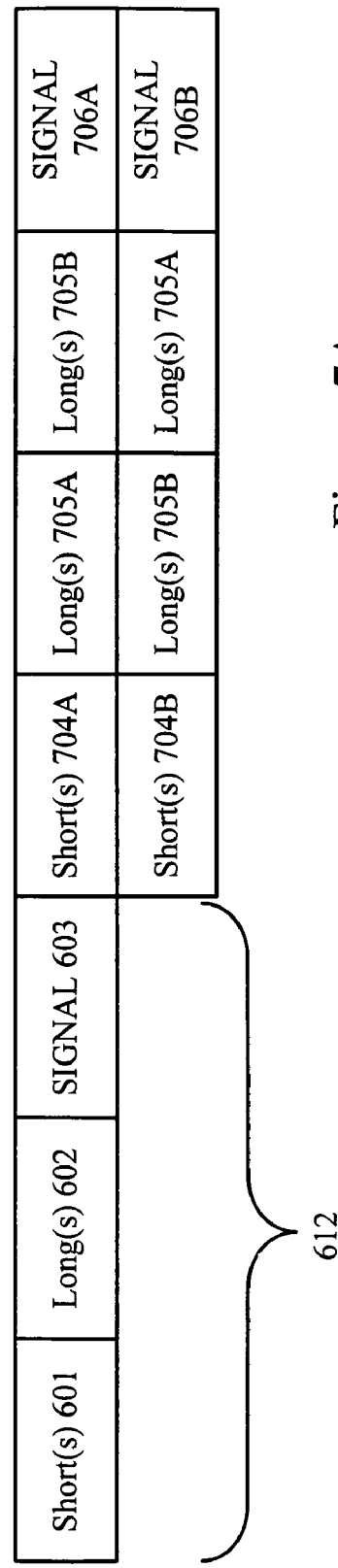
FIG. 7A illustrates an exemplary pattern for a MIMO packet including split short and long symbols to facilitate improved receiver gain control.

FIG. 7A illustrates another exemplary pattern 700 for a MIMO packet including legacy header 612. Pattern 700 can advantageously split short and long symbols to facilitate improved receiver gain control (i.e. to ensure continuous received power even if the transmit paths are dissimilar). In pattern 700, additional short symbols 704A and 704B can be inserted after legacy header 612, thereby allowing a receiver to perform a secondary gain adjustment.

To get constant received power, the training symbols transmitted from the two (i.e. the first and second) antennas should be incoherent. This incoherence can be achieved by splitting the short symbols and the long symbols in the frequency domain. In other words, short symbols 704A use one half of the bins used by short symbols 601 and short symbols 704B use the other half of the bins (thus, 704A+704B=601). Similarly, long symbols 705A use one half of the bins used by long symbols 602 and long symbols 705B use the other half of the bins (thus, 705A+705B=602). In one embodiment, each antenna can transmit using both halves of the bins but at different times.

Because only half of the bins are used on one transmit antenna, the power per bin should be doubled for the split short symbols and long symbols. Notably, the received power will remain constant starting from the split short symbols. Therefore, the gain setting during the split short symbols will be valid for the data symbols. At the receiver, the channel estimation is pulled out for half of the bins at a time and can be combined and smoothed after both halves are available.

The splitting can be done in various ways. For example, in one embodiment, long symbols 705A can use bins −26, −24, . . . −2, 1, 3, . . . 25, whereas long symbols 705B can use bins −25, −23, . . . −1, 2, 4, . . . 26. In another embodiment, long symbols 705A can use bins −26, −24, . . . −2, 2, 4, . . . 26 and long symbols 705B can use bins −25, −23, . . . −1, 1, 3, . . . 25. Note that if the peak-to-average ratio (PAR) of long symbol 602 is 3.18 dB and the data in each bin remains the same after splitting, then the first bin use embodiment yields a PAR of 5.84 dB and 6.04 dB for long symbols 705A and 705B, respectively, whereas the second bin use embodiment yields a PAR of 5.58 dB and 5.85 dB for long symbols 705A and 705B, respectively.

Notably, split short and long symbols can be generalized to any plurality of data streams. For example, as shown in FIG. 7B, if there are three streams, then the bins should be split into three groups, A, B, and C, interleaved and spaced evenly across all the bins. Thus, for the split shorts, the first antenna can transmit short symbols 414A (using bins A), the second antenna can transmit short symbols 414B (using bins B), and the third antenna can transmit short symbols 414C (using bins C).

For the split long symbols, the first antenna can transmit long symbols 415A, 415B, and 415C (using bins A, B, and C, respectively) sequentially, the second antenna can transmit long symbols 415B, 415C, and 415A (using bins B, C, and A, respectively) sequentially, and the third antenna can transmit long symbols 415C, 415A, and 415B (using bins C, A, and B, respectively) sequentially. This rotation pattern allows channel estimation for all bins and ensures orthogonality in the frequency domain at all times.

One exemplary long sequence for two steams at 20 MHz can be $L_{-26:26}$={−1 1 −1 1 1 1 −1 −1 −1 −1 1 1 1 1 −1 1 −1 1 −1 −1 1 1 1 −1 1 1 1 0 −1 1 1 −1 −1 1 −1 −1 1 −1 −1 1 −1 1 1 1 −1 1 1 1 1 1 1 1}, wherein long symbol 705A uses bins [−26:2:−2 2:2:26] with a PAR of 2.73 dB and long symbol 705B uses bins [−25:2:−1 1:2:25] with a PAR of 2.67 dB.

An exemplary sequence for 3 streams at 20 MHz can be $L_{-26:26}$={−1 −1 1 1 1 1 1 −1 −1 −1 1 −1 1 −1 −1 −1 1 1 1 1 1 1 1 −1 −1 1 0 1 −1 −1 −1 1 −1 1 −1 1 −1 1 1 1 −1 1 1 1 −1 1 1 −1 1 −1 −1 1}, wherein the first tone set is [−26:3:−2 2:3:26] with a PAR of 3.37 dB, the second tone set is [−25:3:−1 3:3:24] with a PAR of 3.10 dB, and the third tone set is [−24:3:−3 1:3:25] with a PAR of 3.10 dB. An exemplary sequence for 4 streams at 20 MHz can be $L_{-26:26}$={−1 1 1 1 1 −1 −1 −1 1 1 −1 1 1 1 1 −1 1 1 −1 1 −1 −1 1 1 1 1 −1 1 1 0 1 1 −1 1 −1 −1 1 1 1 1 −1 1 1 −1 1 1 1 1 −1 1 1 1}, wherein the first tone set is [−26:4:−2 3:4:23] with a PAR of 3.05 dB, the second tone set is [−25:4:−1 4:4:24] with a PAR of 3.05 dB, the third tone set is [−24:4:−4 1:4:25] with a PAR of 3.11 dB, and the fourth tone set is [−23:4:−3 2:4:26] with a PAR of 3.11 dB.

An exemplary long sequence for 1 stream at 40 MHz can be:

$$L_{-58,+58} = \{-1\ 1\ 1\ 1\ 1\ -1\ 1\ 1\ -1\ -1\ -1\ -1\ 1$$
$$1\ 1\ 1\ 1\ -1\ 1\ 1\ -1\ 1\ -1\ 1\ 1\ -1$$
$$-1\ 1\ 1\ -1\ -1\ 1\ 1\ -1\ -1\ -1\ -1\ -1\ 1$$
$$-1\ 1\ 1\ -1\ -1\ -1\ 1\ -1\ -1\ 1\ -1\ -1\ 1$$
$$1\ -1\ 1\ 1\ 1\ 0\ 0\ 0\ -1\ -1\ -1\ -1\ -1$$
$$-1\ -1\ -1\ -1\ -1\ -1\ 1\ 1\ 1\ -1\ 1\ -1\ 1$$
$$1\ -1\ -1\ 1\ -1\ -1\ 1\ -1\ 1\ -1\ 1\ -1\ -1$$
$$-1\ -1\ 1\ 1\ -1\ 1\ -1\ -1\ -1\ 1\ -1\ 1\ -1$$
$$1\ -1\ 1\ 1\ -1\ 1\ -1\ -1\ 1\ -1\ 1\ 1\ 1\}$$

An exemplary long sequence for 2 streams at 40 MHz can be:

$$L_{-58,+58} = \{-1\ 1\ 1\ 1\ 1\ -1\ 1\ 1\ -1\ -1\ -1\ -1\ 1$$
$$1\ -1\ 1\ 1\ -1\ 1\ 1\ -1\ 1\ -1\ 1\ 1\ -1$$
$$-1\ 1\ 1\ -1\ -1\ 1\ 1\ -1\ -1\ -1\ 1\ -1\ 1$$
$$-1\ 1\ 1\ 1\ -1\ -1\ 1\ -1\ -1\ -1\ -1\ -1\ -1$$
$$1\ -1\ 1\ 1\ -1\ 1\ 0\ 0\ 0\ -1\ -1\ -1\ -1\ -1$$
$$-1\ -1\ -1\ -1\ -1\ -1\ 1\ 1\ 1\ -1\ 1\ -1\ 1$$
$$1\ -1\ -1\ 1\ 1\ -1\ 1\ -1\ 1\ -1\ 1\ -1\ -1$$
$$-1\ -1\ 1\ 1\ -1\ 1\ -1\ -1\ -1\ -1\ -1\ 1\ -1$$
$$1\ 1\ 1\ 1\ -1\ 1\ 1\ -1\ 1\ -1\ 1\ 1\ 1\}$$

wherein the first tone set is [−58:2:−2 2:2:58] and the second tone set is [−57:2:−3 3:2:57].

An exemplary long sequence for 3 streams at 40 MHz can be:

$$L_{-58,+58} = \{-1\ -1\ -1\ -1\ -1\ -1\ 1\ 1\ 1\ -1\ -1\ -1\ -1$$
$$-1\ -1\ 1\ 1\ 1\ -1\ -1\ -1\ -1\ -1\ -1\ 1\ 1$$
$$1\ 1\ 1\ 1\ 1\ 1\ -1\ -1\ -1\ -1\ -1\ -1$$
$$1\ 1\ 1\ 1\ 1\ -1\ -1\ -1\ -1\ -1\ -1\ -1$$
$$-1\ -1\ -1\ -1\ -1\ 0\ 0\ 0\ -1\ -1\ -1\ -1\ -1$$
$$-1\ -1\ -1\ -1\ -1\ -1\ -1\ 1\ 1\ 1\ -1\ -1\ -1$$
$$1\ 1\ 1\ 1\ 1\ 1\ 1\ 1\ -1\ -1\ -1\ -1$$
$$-1\ -1\ -1\ -1\ -1\ -1\ -1\ -1\ 1\ 1\ 1\ 1\ 1$$
$$1\ 1\ 1\ 1\ 1\ 1\ 1\ 1\ 1\ -1\ -1\ -1\}$$

wherein the first tone set is [−58:3:−4 2:3:56], the second tone set is [−57:3:−3 3:3:57], and the third tone set is [−56:3:−2 4:3:58].

An exemplary long sequence for 4 streams at 40 MHz can be:

$$L_{-58,+58} = \{-1\ 1\ -1\ -1\ -1\ 1\ 1\ -1\ 1\ 1\ 1\ -1\ 1$$
$$1\ 1\ 1\ -1\ -1\ -1\ -1\ 1\ -1\ -1\ -1\ 1\ -1$$
$$1\ -1\ 1\ -1\ -1\ -1\ -1\ 1\ 1\ -1\ -1\ -1\ 1$$
$$1\ 1\ 1\ -1\ 1\ -1\ -1\ 1\ -1\ 1\ 1\ 1\ 1$$
$$1\ -1\ -1\ -1\ 1\ 0\ 0\ 0\ -1\ 1\ 1\ -1\ -1$$
$$-1\ -1\ -1\ 1\ 1\ 1\ -1\ 1\ 1\ -1\ -1\ -1\ 1$$
$$-1\ 1\ -1\ -1\ -1\ 1\ -1\ 1\ -1\ -1\ 1\ 1\ 1$$
$$1\ 1\ 1\ 1\ -1\ -1\ -1\ -1\ 1\ 1\ -1\ 1\ 1$$
$$1\ -1\ 1\ 1\ -1\ -1\ 1\ -1\ 1\ -1\ -1\ 1\ 1\}$$

where the first tone set is [−58:4:−2 5:4:57], the second tone set is [−57:4:−5 2:4:58], the third tone set is [−56:4:−4 3:4:55], and the fourth tone set is [−55:4:−3 4:4:56]. Note that to reduce PAR, a random search of the data pattern can be performed.

The short symbols can be split similarly, while recognizing that only 1 out of 4 bins is used. For example, in one embodiment, short symbols 704A can use bins −24, −16, −8, 4, 12, 20 whereas short symbols 704B can use bins −20, −12, −4, 8, 16, 24. In another embodiment, short symbols 704A can use bins −24, −16, −8, 8, 16, 24 whereas short symbols 704B can use bins −20, −12, −4, 4, 12, 20. If the PAR of short symbol 601 is 2.09 dB, then the first bin use embodiment yields a 4.67 dB PAR for both short symbols 704A and 704B, whereas the second bin use embodiment yields a PAR of 4.32 dB for short symbol 704A and a PAR of 2.79 dB for short symbol 704B. Note that an exhaustive search for the first bin use embodiment yields a minimum PAR of 4.26 dB. A similar exhaustive search for the second bin use embodiment yields a minimum PAR of 1.68 dB for short symbol 704A with polarity {1 −1 1 −1 −1 −1}, and a minimum PAR of 2.79 dB for short symbol 704B with polarity {1 −1 −1 −1 −1 1}.

Note that there are only a small number of bins used for each split short. Therefore, when the channel is frequency selective and assuming that the split short symbols, the split long symbols and the SIGNAL symbols have the same transmitted power, the average received power can be significantly different in the split short symbols. This power differential can cause problems for receiver gain control. Therefore, in one embodiment, 24 bins can be used for the short symbols, thereby ensuring more bins for each split short symbol. In another embodiment, shifted shorts with 12 bins can be used in all data streams, but each data stream can use a different frequency shift, i.e. 1, 2, or 3 bins, from the original shorts. This frequency shift can ensure the continuity in received power from the shifted short symbols to the split long symbols and thereafter. However, note that in this scheme, the number of transmit data streams that can be supported is no more than four. Additionally, the period of the shifted short symbols is longer than that of the legacy short symbol, which may require modifications in frequency offset estimation implementations.

As noted above, the legacy header can be transmitted from a set of antennas. In the event that the set includes a plurality of antennas, beam-forming effects can occur. To achieve omni-directional transmission, the complex contribution of each frequency bin to each of the antennas can be weighted. For example, phase shifts (e.g. phase ramps or alternatively any type of phase shift) and/or phase magnitudes can be applied across the bins on the other antennas so that different bins experience different beam forming. An exemplary technique to create phase ramps includes cyclic delayed diversity (CDD), which is well known to those skilled in wireless technology.

An example of phase magnitudes would be to use the even bins on one antenna and the odd bins on another antenna. In another example of phase magnitudes, all positive frequency bins can be used for one antenna and all negative frequency bins can be used for another antenna. Thus, generally, weighting the contribution of each frequency bin independently to the two antennas can be used to create an omni-directional transmission.

Because a receiver capable of receiving MIMO packets should also be able to receive legacy 802.11a/g packets, a mechanism can be provided to label a MIMO packet different from a legacy packet. Additionally, if a packet is a MIMO packet, then the receiver also needs to know the number of transmitted data streams. In one embodiment shown in FIG. 7C, a first set of bits in legacy SIGNAL symbol 603 can indicate a MIMO packet and a second set of bits in legacy SIGNAL symbol 603 can indicate the number of transmitted data streams. For example, a reserved bit R of SIGNAL symbol 603 can be set to "1" to indicate that a MIMO packet is being transmitted. Additionally, a predetermined number of least significant bits in a length field 721 of SIGNAL symbol 603 can be used to indicate the number of transmitted data streams. Thus, if two least significant bits are used, then the length value in length field 721 would be rounded to the third least significant bit.

Note that after a MIMO receiver decodes legacy SIGNAL symbol 603, it can check the reserved bit R. If that bit is "0", then the packet is a legacy packet, and the length value in length field 721 is the true packet length in bytes. However, if the reserved bit is "1", then the packet is a MIMO packet, and the last two bits of the LENGTH field are the number of transmitted data streams. In the latter case, the length of the packet is accurate within 2 bytes. Notably, a legacy receiver only uses the length value to compute the time it should refrain from transmission. Therefore, the value in length field 721 need not be very accurate for a legacy device. Advantageously, and noted above, the true length of each data stream can be included in the MIMO SIGNAL symbols (e.g. 706A and 706B in FIG. 7A). Therefore, a MIMO receiver can effectively ignore the value stored in length field 721.

In another embodiment, a 'modulo' operation can be used to represent the number of MIMO streams. Specifically, if the number of data bytes of the packet is L, the number of data bytes per symbol is B, and the number of service and tail bytes is C, then the number of symbols required is $$N_{sym} = \left\lceil \frac{L+C}{B} \right\rceil$$

wherein ⌈ ⌉ stands for rounding up to the nearest integer. Suppose the number of data streams is M, and M≦B. In this case, the modified length is $$\tilde{L} = B \cdot (N_{sym} - 1) - C + M$$

Note that the number of symbols computed by the legacy device is still $N_{sym}$:

$$\hat{N}_{sym} = \left\lceil \frac{\tilde{L}+C}{B} \right\rceil = \left\lceil \frac{B \cdot (N_{sym}-1) + M}{B} \right\rceil = N_{sym}$$

The MIMO device can compute the number of streams by:

$$\hat{M} = (\tilde{L}+C) \bmod B = M$$

If M=B, then $\hat{M}$ will be zero. In this case, a mapping $\hat{M}$=B will take place. Note that this same technique can be applied to signaling other information besides the number of streams, wherein the information to be signaled is encoded as M above.

In yet another embodiment, an encoding symbol 722 can be inserted after legacy SIGNAL symbol 603 to indicate the MIMO packet (and retaining the reserved bit for other uses). Encoding symbol 722 can include MIMO SIGNAL symbols with flipped pilot tones (i.e. +/−) (with respect to regular symbols that would otherwise appear in that location). For example, encoding symbol 722 can include modified SIGNAL symbols 706A' and 706B' with BPSK modulation for robustness. In this embodiment, the MIMO receiver can determine whether an incoming packet is a MIMO packet or legacy packet based on the phase of the pilots of encoding symbol 722. If it is a MIMO packet, then the number of transmitted data streams can be extracted and the rest of the packet can be detected in MIMO-compliant manner. Otherwise, the packet is treated as legacy 802.11a/g packet.

Pilots

Pilots are inserted in 802.11a/g systems for frequency offset and phase noise tracking. In a MIMO system where multiple radios are used at the transmitter and the receiver, different transmit and receive chains may experience common or independent phase noise. In accordance with one aspect of the invention, pilot tracking schemes can be advantageously provided for joint, per transmit chain, or per transmit-receive pair.

Due to frequency offset between the transmitter and receiver and phase noise, the phase of the received data symbols can vary during the transmission of the packet. To track and correct the phase variations, four pilot bins are inserted into each OFDM symbol in 802.11a/g in the format of [1 1 1 −1]*$p_l$, where [1 1 1 −1] is the pattern across pilot bins and $p_l$ is the pilot polarity for symbol l. For MIMO OFDM symbols, both the 4-bit pattern and the pilot polarity sequence can be generalized to multiple spatial streams.

In one embodiment, the same pilot format as 802.11a/g is duplicated in all transmitted data streams. For example, if the pilot polarity sequence for 802.11a/g symbols is $p_0, p_1, p_2, p_3, p_4 \ldots$, then the following pilot polarity can be used for the MIMO symbols, where different rows represent different transmitted streams:

$p_0 \quad p_1 \quad p_2 \quad p_3 \quad p_4 \cdots$ $p_0 \quad p_1 \quad p_2 \quad p_3 \quad p_4 \cdots$ $p_0 \quad p_1 \quad p_2 \quad p_3 \quad p_4 \cdots$ Because the pilot polarity is the same across the different spatial streams, a fixed beam-forming pattern in the pilot bins will result if the 4-bit pilot pattern is also duplicated across streams. To ensure that bad bins do not stay in a null all the time, phase shifts can be added and cyclicly rotated across the 4 bins from symbol to symbol. For example:

|  | sym1 | sym2 | sym3 | sym4 |
|---|---|---|---|---|
| Ant 1 | [1 1 1 1] | [1 1 1 1] | [1 1 1 1] | [1 1 1 1] |
| Ant 2 | [1 j −1 −j] | [j −1 −j 1] | [−1 −j 1 j] | [−j 1 j −1] |

The pilots on the second antenna (Ant 2) have 0, 90, 180, and 270 degrees of phase shift in the first symbol (sym1), and are cyclicly rotated to the left for subsequent symbols. Note that an initial pilot pattern of [1 1 1 1] for 4 pilot bins is used in the above example, but this scheme can be applied to any initial pilot pattern and more than 4 pilots bins. Thus, in general, pilots can be spaced across any frequency spectrum to perform estimations.

Pilot tracking can be performed in different ways. For example, if the phase noise is common across all transmit and receive chains (thereby allowing joint pilot tracking), then each receive chain can estimate the received signal in each pilot bin based on the channel estimation and the known pilot patterns. The complex conjugate of this estimate can then be multiplied to the actual received pilot signal. The results can be combined across pilot bins as well as chains. The phase of the final result is then the desired phase offset. In mathematical formulation, the received signal on receiver n in pilot bin k is represented by:

$$y_{n,k} = \sum_m H_{n,m,k} e^{j\theta} \cdot s_{m,k} + n_{n,k} \qquad \text{Eq. 1}$$

where $s_{m,k}$ is the pilot symbol of stream m, $\theta$ is the common phase offset, $H_{n,m,k}$ is the channel response, and $n_{n,k}$ is the noise. The common phase offset is represented by:

$$\theta = \text{angle}\left(\sum_{n,k} y_{n,k} \cdot \left(\sum_m \hat{H}_{n,m,k} s_{m,k}\right)^*\right) \qquad \text{Eq. 2}$$

where $\hat{H}_{n,m,k}$ is the estimated channel.

In contrast, if separate phase noise is present across different transmit chains (thereby necessitating pilot tracking per transmit chain), then MIMO detection algorithms can first be applied to the pilot bins to detect the pilots $\hat{s}_{m,k}$. Because $\hat{s}_{m,k} \approx s_{m,k} \cdot e^{j\theta_t(m)}$, where $\theta_t(m)$ is the phase offset of stream m, the phase difference between the decoded pilots and the ideal pilots can be averaged over the pilot bins of each data stream to generate the phase estimate, $$\hat{\theta}_t(m) = \text{angle}\left(\sum_k \hat{s}_{m,k} \cdot s^*_{m,k}\right) \qquad \text{Eq. 3}$$

If phase noise is independent across transmit chains and receive chain (thereby necessitating pilot tracking per transmit-receive pair), the pilot polarity sequences can be modulated with orthogonal patterns so that the phase can be estimated separately for each transmit-receive pair. For example, if the number of transmitted data streams is, then the modulating pattern for stream m, wherein $1 \leq m \leq M$, can be represented by $$q_m(l) = e^{j\frac{2\pi}{M}(m-1)l},$$

where $l \geq 0$ is the index of the MIMO symbols. For example, an exemplary modulated pilot polarity sequence for three transmitted streams could be:

| $p_0$ | $p_1$ | $p_2$ | $p_3$ | $p_4$ | $\cdots$ |
|---|---|---|---|---|---|
| $p_0$ | $p_1 e^{j2\pi/3}$ | $p_2 e^{-j2\pi/3}$ | $p_3$ | $p_4 e^{j2\pi/3}$ | $\cdots$ |
| $p_0$ | $p_1 e^{-j2\pi/3}$ | $p_2 e^{j2\pi/3}$ | $p_3$ | $p_4 e^{-j2\pi/3}$ | $\cdots$ |

Note that $$\frac{1}{M} \sum_{l=k}^{k+M-1} q_m(l) q_n^*(l) = \delta_{m,n}, \text{ where } \delta_{m,n} = \begin{cases} 1 & \text{for } m = n \\ 0 & \text{for } m \neq n \end{cases}$$

i.e. the patterns are orthogonal across data streams over any interval of M symbols long with k representing a starting index of M orthogonal data symbols. In this case, the same 4-bit pilot pattern should be used for all streams to maintain orthogonality.

In one embodiment, the last (M−1) symbols received on each antenna can be saved in a buffer. Thereafter, when a new symbol is received on each antenna, the complex conjugate of the pilots for these M symbols is multiplied to the symbols and summed, $$\sum_l y_{n,k}(l) \cdot r^*_{m,k}(l),$$

where $y_{n,k}(l)$ is the received signal on chain n in bin k for the l-th symbol, and $r_{m,k}(l)$ is the pilot symbol in stream m in bin k for the l-th symbol. The term $r_{m,k}(l)$ includes the bin pilot pattern, the original pilot polarity, and the orthogonal modulation. This computation is performed for all transmit-receive pairs (m,n) in all pilot bins k. The result can then be multiplied with the complex conjugate of the channel estimation, thereby yielding the orthogonally combined and channel corrected pilots, which can be represented by:

$$v_{n,m,k} = \sum_l y_{n,k}(l) \cdot r^*_{m,k}(l) \cdot H^*_{n,m,k} \qquad \text{Eq. 4}$$

The phase offset of stream m on receive antenna n is then estimated by averaging over the pilot bins, which is represented by:

$$\theta_{n,m} = \text{angle}\left(\sum_k v_{n,m,k}\right) \qquad \text{Eq. 5}$$

$$= \text{angle}\left(\sum_k \sum_l y_{n,k}(l) \cdot r^*_{m,k}(l) \cdot H^*_{n,m,k}\right)$$

For the first (M−1) MIMO symbols, the joint or per transmit chain pilot tracking methods can be used since the history is not long enough. Moreover, any orthogonal pattern $q_m(l)$ (where m and l are defined as above) satisfying the following condition, can be used to modulate the pilot polarity sequence:

$$\frac{1}{M} \sum_{l=k}^{k+M-1} q_m(l) q_n^*(l) = \delta_{m,n}, \text{ where } \delta_{m,n} = \begin{cases} 1 & \text{for } m = n \\ 0 & \text{for } m \neq n \end{cases}$$

where m, n, l, k, and M are as defined above. For example, the modulated pilot polarity sequences for three transmitted streams of the above example would be:

| $p_0 q_1(0)$ | $p_1 q_1(1)$ | $p_2 q_1(2)$ | $p_3 q_1(3)$ | $p_4 q_1(4)$ | $\cdots$ |
|---|---|---|---|---|---|
| $p_0 q_2(0)$ | $p_1 q_2(1)$ | $p_2 q_2(2)$ | $p_3 q_2(3)$ | $p_4 q_2(4)$ | $\cdots$ |
| $p_0 q_3(0)$ | $p_1 q_3(1)$ | $p_2 q_3(2)$ | $p_3 q_3(3)$ | $p_4 q_3(4)$ | $\cdots$ |

Note that the inheritance of the 802.11a/g pilot polarity sequence is merely for similarity and can be abandoned all together, i.e. setting $p_l=1$. This setting leads to a third and a fourth embodiment. In the third embodiment, the pilot polarity sequences are all ones, as represented by:

| 1 | 1 | 1 | 1 | 1 | ... |
| 1 | 1 | 1 | 1 | 1 | ... |
| 1 | 1 | 1 | 1 | 1 | ... |

Similar to the first embodiment, cyclicly rotated phase shifts across pilot bins should be included to avoid fixed beam forming effect. Either joint pilot tracking or pilot tracking per transmit chain can be performed.

In the fourth embodiment, the pilot sequences are just $q_m(l)$, which can be represented by:

$$q_1(0) \quad q_1(1) \quad q_1(2) \quad q_1(3) \quad q_1(4) \quad \cdots$$
$$q_2(0) \quad q_2(1) \quad q_2(2) \quad q_2(3) \quad q_2(4) \quad \cdots$$
$$q_3(0) \quad q_3(1) \quad q_3(2) \quad q_3(3) \quad q_3(4) \quad \cdots$$

In this case, the same pilot pattern across bins can be used for all streams. Pilot tracking per transmit-receive pair can be performed.

Data Stream Splitting

To form the MIMO SIGNAL symbols, the source data bits need to be split appropriately into multiple data streams. In 802.11a/g, convolutional codes of rate ½, ⅔ and ¾ are used, and four modulation schemes are provided (i.e., BPSK, QPSK, 16QAM and 64QAM). The code rate and modulation scheme determine the number of bits in each OFDM symbol. For optimal MIMO performance, different modulations and coding rates should be allowed for different data streams. Therefore, the number of bits in each MIMO SIGNAL symbol can be different for the different data streams.

A typical coding block consists of an encoder and a puncturer, both of which are well known in the art of WLAN technology (e.g. puncturers are described in IEEE 802.11a, section 17.3.5.6). In accordance with one aspect of the invention, different codes can be constructed by using the same encoder but different puncturers, or by using the same puncturer but different encoders. If the same encoder is used, then splitting can be done either before the encoder or before the puncturer. On the other hand, if different encoders are used, then splitting must be done before the encoders. Splitting before the puncturer is referred to herein as a "shared" encoder, whereas splitting before the encoders is referred to herein as "separate" encoders. Note that in 802.11a/g, both rate ⅔ and rate ¾ codes are punctured from the rate ½ convolutional code. Therefore, either a shared encoder or separate encoders can be implemented.

Additional bits can be inserted before and after the source data bits to initialize and terminate the encoder. For example, in 802.11a/g, 16 service bits can be added before and 6 tail bits can be added after the source data bits. Therefore, in the case of separate encoders, these added bits can be inserted for each encoder.

Figure 8:
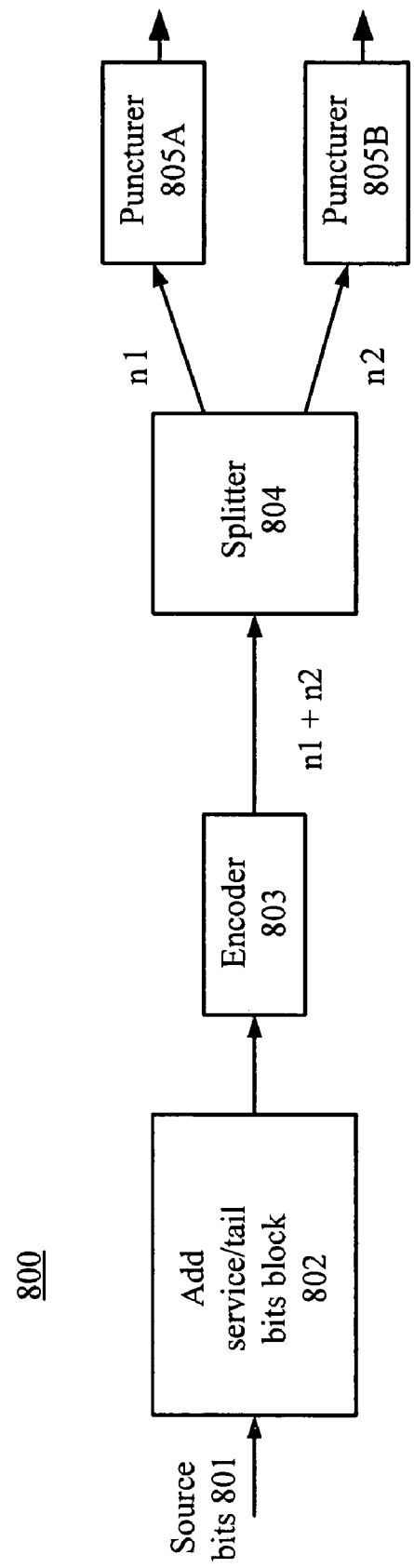
FIG. 8 illustrates an exemplary shared encoder system for two spatial streams.

FIG. 8 illustrates an exemplary shared encoder system 800 for two spatial streams. In system 800, source data bits 801 can be provided to block 802, which adds the above-described service/tail bits. An encoder 803 receives the modified bits and generates n1+n2 bits. A splitter 804 receives n1+n2 bits and generates two spatial streams, which in turn are provided to puncturers 805A and 805B, respectively.

In one embodiment, for every n1+n2 bits after encoder 803, the first spatial stream gets the first n1 bits, and the second spatial stream gets the last n2 bits. One exemplary chunk size is $n_i = N_{cbps}(i)$ (wherein $N_{cbps}$ is the number of coded bits per symbol before puncturing), thereby splitting symbol by symbol. Another exemplary chunk size is $n_i = N_{cbps}(i)/\gcd(N_{cbps}(1),N_{cbps}(2))$ (wherein gcd( ) stands for the greatest common divider), thereby reducing the splitting chunk size while maintaining a proper ratio to reduce processing delay.

In this embodiment, the length fields in the MIMO SIGNAL symbols are set to the true length of the packet in bytes. The R14 fields in the MIMO SIGNAL symbols are set to the individual data rates. The R14 field in the legacy SIGNAL symbol can be set to the data rate of the first data stream, or always set to the lowest data rate. As described in further detail below, the length field in the legacy SIGNAL symbol can be manipulated such that the number of symbols computed by a legacy device can be consistent with the actual duration of the packet.

Figure 9:
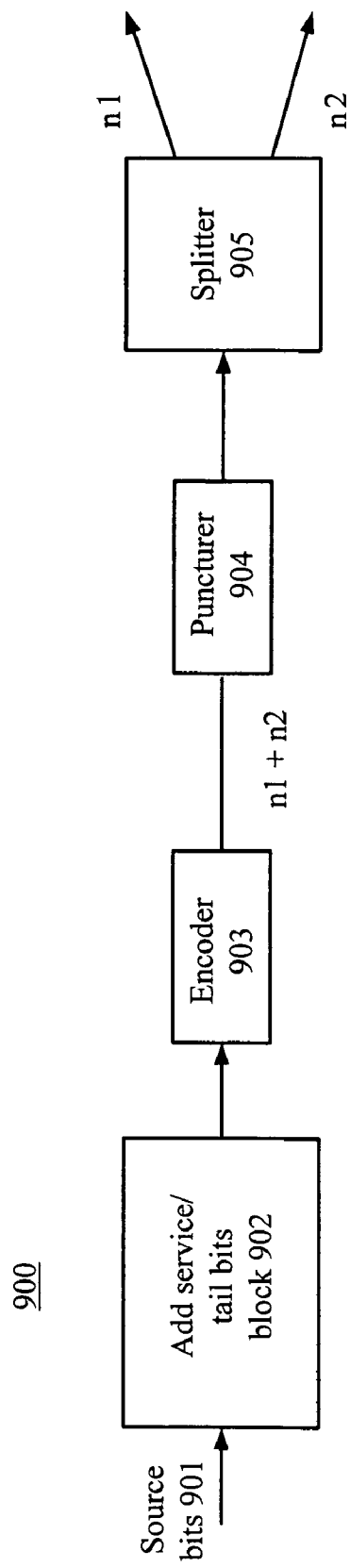
FIG. 9 illustrates another exemplary shared encoder system for two spatial streams.

FIG. 9 illustrates another exemplary shared encoder system 900 for two spatial streams. In system 900, source data bits 901 can be provided to block 902, which adds the service/ tail bits. An encoder 903 receives the modified bits and generates n1+n2 bits. A puncturer 904 receives the n1+n2 bits and generates an output code at a predetermined rate. A splitter 905 receives the n1+n2 bits at the predetermined rate and generates the two spatial streams, i.e. n1 bits and n2 bits. Once again, for every n1+n2 bits after encoder 903, the first spatial stream gets the first n1 bits, and the second spatial stream gets the last n2 bits.

Figure 10:
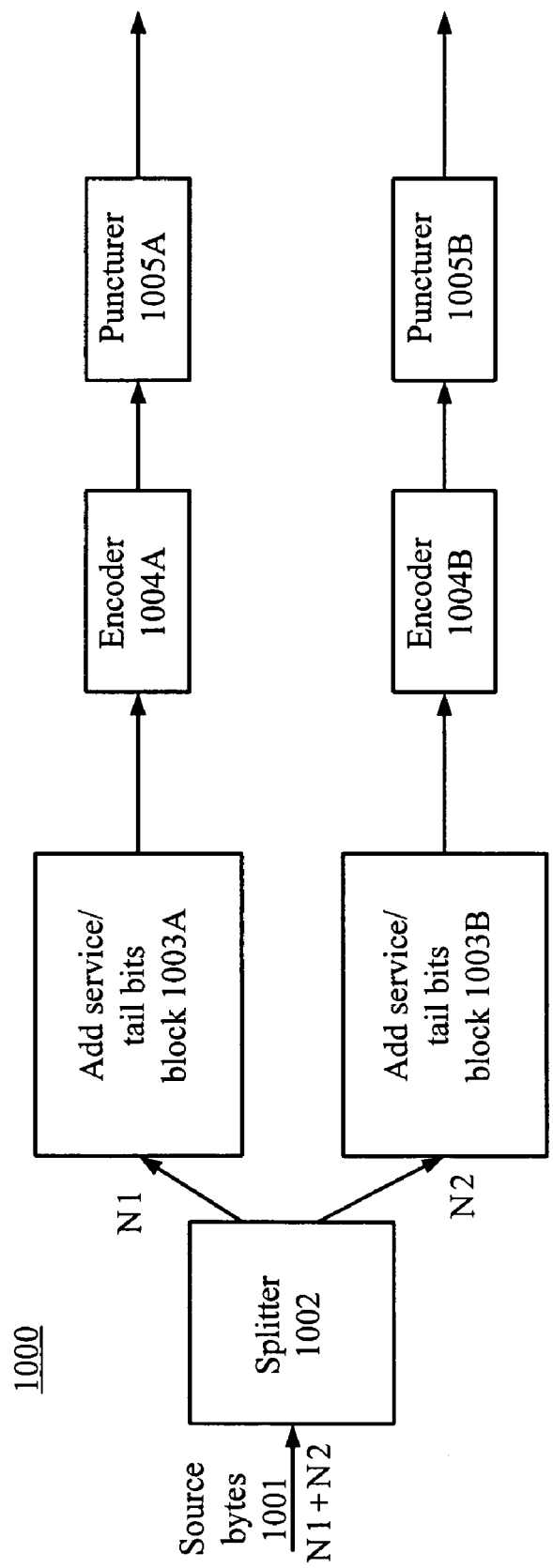
FIG. 10 illustrates an exemplary separate encoder system for two spatial streams.

FIG. 10 illustrates an exemplary separate encoder system 1000 for two spatial streams. In system 1000, source data bytes 1001, i.e. N1+N2, can be provided to a splitter 1002, which generates the two spatial streams (the first spatial stream getting the first N1 bytes and the second spatial stream getting the last N2 bytes). Blocks 1003A and 1003B receive and adds the service/tail bits to the N1 and N2 bytes, respectively. Encoders 904A and 904B receives the modified bytes, encode the modified bytes, and provide their encoded outputs to puncturers 905A and 905B, respectively.

Note that in a separate encoder system, the minimum data unit is in bytes because the length field in the SIGNAL symbol is in bytes. Therefore, in this case, each stream can add 2 bytes of service bits at the beginning and 6 tail bits (~1 byte) at the end. Note that N1 can be the number of data bytes per symbol, or that divided by the greatest common divider of all numbers of data bytes per symbol. The number of bytes per symbol is integer for all data rates except for 9 Mbps, wherein each symbol contains 4.5 bytes. Therefore, in this case, the chunk size can alternate between 4 bytes and 5 bytes for data streams using 9 Mbps.

For example, assume there are two spatial streams (stream1 and stream2), and the number of data bytes per symbol is 27 (54 Mbps) and 4.5 (9 Mbps), respectively. Initially, the 2 service bytes can be sent to each of stream1 and stream2. Then, the first 25 (27−2) data bytes can be sent to stream1, the next 2 (4−2) data bytes can be sent to stream2, and the next 27 bytes to stream1, the next 5 bytes to stream2, and so on.

The values of the length field of the MIMO SIGNAL symbols are needed before the actual splitting is performed. The straightforward sequential splitting described above leads to a slightly complicated length calculation. Following is a simple length calculation that can be realized with slight modification to the splitting. First, the total number of symbols needed is computed:

$$N_{sym} = \left\lceil \frac{L + 3M}{\sum_i B(i)} \right\rceil \quad \text{(Eq. 6)}$$

wherein L is the total number of uncoded bytes in the packet, M is the number of data streams, and B(i) is the number of uncoded bytes per symbol for stream i. ⌈ ⌉ stands for rounding up to the nearest integer. If there are K data streams using 9 Mbps and $N_{sym}$ is odd, then recalculate:

$$N_{sym} = \left\lceil \frac{L + 3M + 0.5K}{\sum_i B(i)} \right\rceil \quad \text{(Eq. 7)}$$

The number of bytes in the first data stream is then $L(1)=\lfloor B(1)N_{sym}-3 \rfloor$, wherein $\lfloor\ \rfloor$ stands for rounding down to the nearest integer, the number of bytes in the second stream is $L(2)=\min(\lfloor B(2)N_{sym}-3 \rfloor, L-L(1))$, and so on. A byte counter can be used for each stream. A stream can be skipped in the sequential splitting once its byte quota is met. Note that both equations 6 and 7 apply to general encoders and puncturers, a general number of data streams, and a general number of service/tail bits. Note that system 900 has only one length and therefore equations 6 and 7 do not apply to that system.

In 802.11a/g packets, the length field in the SIGNAL symbol is 12 bits long, which corresponds to a maximum packet size of 4095 bytes. In MIMO systems, packets larger than 4K bytes are desirable to maintain high payload efficiency. Therefore, signaling the exact packet length may require more bits than that can be contained in a single SIGNAL symbol.

In accordance with one embodiment, a pseudo-rate and pseudo-length can be used in the legacy SIGNAL symbol to indicate a rate and length that will occupy the same air-time as the MIMO packet. The lowest legal legacy rate (e.g. 6 Mbps for 802.11a/g) can be used to allow the packets to have the longest duration (4096 bytes @ 6 Mbps=5.46 ms or for the longest valid 802.11 packet length, 2304 bytes @ 6 Mbps=3.07 ms).

In one embodiment, for the MIMO SIGNAL symbols, a relative packet length can be used instead of the absolute length to limit the number of required bits. The relative length is the total number of bytes that can be transmitted in a packet with the same number of symbols less the actual number of bytes transmitted, or roughly the number of padded bytes. As described above, the total number of bytes can be computed using the number of symbols in the packet (determined from the legacy SIGNAL symbol) and the data rates (encoded in the MIMO SIGNAL symbols).

For shared encoders, a single relative length is determined and transmitted only in the MIMO SIGNAL symbols of the first stream. The length fields in the other data streams can be reserved for other uses. For separate encoders, the relative length can be computed for each data stream and transmitted separately. Alternatively, a single relative length for all data streams can be computed and transmitted only in the first data stream (i.e. individual relative lengths can be derived from the total relative length for any byte allocation schemes agreed upon between the transmitter and receiver).

AGC and Channel Estimation

Referring back to FIG. 7A, legacy short symbols 601 can be used for coarse frequency estimation, coarse timing estimation, and automatic gain control (AGC). Legacy long symbols 602 can be used for fine frequency estimation, fine timing estimation, and channel estimation. Legacy SIGNAL symbol 603 can include the information necessary to prevent legacy devices from stomping on the MIMO packet, as well as the signature of the MIMO packet and the number of data streams that are transmitted. Split short symbols 704A/B can be used for AGC for the MIMO section of the packet as well as for antenna diversity selection (if appropriate). Split long symbols 705A/B can be used for the MIMO channel estimation. MIMO SIGNAL symbols 706A/B can include the length and modulation information of the transmitted data streams.

Because legacy header 612 may be transmitted from one antenna, while the MIMO header (including short symbols 704A/B, long symbols 705A/B, and SIGNAL symbols 706A/B) is transmitted from multiple antennas, the received power on each receive antenna may change from the legacy header to the MIMO header. In this case, split short symbols can be designed for the AGC to adjust the gain settings so that the input to ADC will be sized properly. Note that the AGC can use a single state machine for all receive chains, but each received chain may have a different gain applied to its corresponding received signal, depending on the signal size.

Additional timing recovery and frequency offset estimation, if necessary, are done jointly using the received split short symbols from the multiple antennas. This joint operation can be performed by combining the multiple received signals. The joint operation can also include choosing the best signal, and using that best signal for timing recovery and offset estimation.

In one embodiment, legacy header 612 can be transmitted from the best antenna to the intended receiver. This implies that the power increase from the legacy header to the MIMO header is no more than 10*log 10(M) dB for a system with M spatial streams. The power increase may be higher for unintended receivers, but the average increase in dB is still 10*log 10(M). Therefore, only fine gain changes are required.

The proposed split longs last 2M OFDM symbols, wherein M is the number of spatial streams. To compute the channel estimation for any spatial stream, the corresponding bins used by each stream can be extracted from the FFT of the 2M OFDM symbols, averaged, and merged in the frequency domain. A smoothing filter can be applied to the frequency domain channel response to reduce estimation errors. For large M, the phase change across the 2M OFDM symbols can be significant. In one embodiment, the phase of each OFDM symbol can be corrected in time domain using the fine frequency estimation obtained from the legacy header before taking the FFT, averaging, and smoothing. Additional measurements of the phase changes (due to inaccuracy of the fine frequency estimate and phase noise) during the 2M long symbols can be used to properly align them prior to smoothing.

Detection of MIMO Signals

A number of different techniques can be used to detect a MIMO signal. Two known techniques are the MMSE-LE and MMSE-DFE detection schemes. The Minimum Mean Square Error (MMSE) Linear Equalization (LE) or Decision Feedback Equalization (DFE) algorithms can be used to separate and detect the multiple data streams. For notation simplicity, only one sub-carrier is considered in the following description, wherein the same procedure would be repeated for each sub-carrier.

Suppose there are M transmitting antennas and N receiving antennas. If the frequency domain transmitted signal is x, the channel is H, the noise is n, and the received signal is y, where x is M-by-1, y and n are N-by-1, and H is N-by-M, then:

$$y = Hx + n, \ E(nn^*) = \sigma^2 I_N$$

It can be shown that the MMSE solution W that minimizes $E\|W^*y-x\|^2$ is:

$$W^* = (H^*H + \sigma^2 I_M)^{-1} H^*, \ R_e = \sigma^2 (H^*H + \sigma^2 I_M)^{-1}$$

wherein $R_e$ is the resulted error variance matrix. In the MMSE-LE algorithm, W* is computed exactly as above and applied to y to detect all the data streams in parallel.

The MMSE-DFE detection algorithm performs successive cancellation using two steps (1) and (2). In step (1), nulling vectors can be computed. Computing the nulling vectors can in turn include three steps (a), (b), and (c). In step (a), the diagonal elements of $R_e$ can be computed and the smallest element found. The smallest element corresponds to the transmit antenna that has the best signal quality. In step (b), the corresponding row of W* can be computed. This will be the nulling vector of the selected transmit antenna. In step (c), the corresponding column in H can be deleted and M decremented by 1. Steps (a), (b), and (c) can be repeated until M=0.

In step 2, multiple data streams can be detected. Step 2, in turn, can include four steps (d), (e), (f), and (g). In step (d), y can be multiplied by the nulling vector for the best transmit antenna, thereby generating the raw decision of the best transmit antenna. In step (e), the corresponding column of H can be multiplied by this raw decision and the result subtracted from y. In step (f), steps (d) and (e) can be repeated for the next best transmit antennas until all antennas are decoded. In step (g) (which is optional), a decision directed feedback channel estimation update can be performed using the data decisions.

Note that the raw decision can be either a hard or a soft decision, wherein the hard decision is simply the constellation point closest to the channel corrected received symbol and the soft decision is a weighted sum of a few most likely constellation points (the weights being proportional to the likelihood of each constellation).

Viterbi Bin Weighting

In one embodiment, Viterbi decoders can be used to decode the convolutionally encoded data streams after detection at the receiver. For frequency selective fading channels, the reliability of the signal in different frequency bins can be different. Therefore, more weight can be assigned to data bits from good bins, and less weight can be assigned to data bits from bad bins in the Viterbi branch metrics computation. In one embodiment, the optimal bin weights can be proportional to the SNR (signal to noise ratio).

In 802.11a/g, where only one data stream is transmitted, SNR can be approximated by the square of the channel amplitude assuming noise is additive white Gaussian across the bins. However, in real systems, SNR often increases slower than the square of the channel amplitude due to channel estimation error, phase noise, and quantization noise. Therefore, in one embodiment, the channel amplitude can be used for bin weighting.

In MIMO systems, the detection SNR of each transmitted data streams can be computed assuming certain noise power density. Similarly, two different methods can be used to determine the Viterbi bin weights. In a first embodiment, the Viterbi bin weights can be proportional to the detection SNR. In a second embodiment, the Viterbi bin weights can be proportional to the square root of the detection SNR.

For MMSE-DFE, the detection SNR computed from the MMSE formulas does not include the impact of error propagation, thereby leading to over-optimistic detection SNR for the data streams that are detected later. This over-optimistic detection SNR can undesirably degrade the decoder performance.

To improve the decoder performance, the impact of error propagation can be included in the noise term for SNR computation. Following is an example of computing the effective noise term for the second and third data streams:

$$\tilde{\sigma}_2^2 = \sigma_2^2 + |w_2^* h_1|^2 \cdot \sigma_1^2$$
$$\tilde{\sigma}_3^2 = \sigma_3^2 + |w_3^* h_2|^2 \cdot \tilde{\sigma}_2^2 + |w_3^* h_1|^2 \cdot \sigma_1^2$$

wherein $\sigma_m^2$ is the original noise term, $w_m$ is the nulling vector, $h_m$ is the channel, and $\tilde{\sigma}_m^2$ is the effective noise term for the m-th data stream.

Compensation for Different Noise Floors

The above derivation of the MMSE detector is based on the assumption that the noise power is the same across the components of y. This assumption is generally not true in real systems because of different noise floors and/or gain settings in the receiver chains. Therefore, the formula can be modified, as now described.

Assume the received signal at the antenna is $$y = Hx + n, \; E\{nn^*\} = \begin{bmatrix} \sigma_1^1 & & \\ & \ddots & \\ & & \sigma_N^1 \end{bmatrix}$$

After AGC, the received signal becomes $$\tilde{y} = \begin{bmatrix} g_1 & & \\ & \ddots & \\ & & g_N \end{bmatrix} \cdot y = \tilde{H}x + \tilde{n}, \; \tilde{H} = \begin{bmatrix} g_1 & & \\ & \ddots & \\ & & g_N \end{bmatrix} \cdot H,$$

$$E\{\tilde{n}\tilde{n}^*\} = \begin{bmatrix} g_1^2 \sigma_1^2 & & \\ & \ddots & \\ & & g_N^2 \sigma_N^2 \end{bmatrix}$$

wherein $\sigma_n^2$ is the noise floor, and $g_n$ is the amplitude gain on the n-th receive antenna respectively. $\tilde{H}$ is the channel estimate since the channel is estimated after AGC.

In order to apply the MMSE solution, the noise variance should be scaled to the same value. To do that, let K=min$_n$ $(g_n \sigma_n)$ and define a scaling matrix $$\Pi = \begin{bmatrix} \frac{K}{g_1 \sigma_1} & & \\ & \ddots & \\ & & \frac{K}{g_N \sigma_N} \end{bmatrix}$$

The scaled channel is $H_{eq} = \Pi \cdot \tilde{H}$, and the resulting noise variance is $\sigma_{eq}^2 = K^2$, constant across all receive antennas. At this point, the nulling vectors $W^*_{eq}$ can be computed using $H_{eq}$ and $\sigma_{eq}^2$.

$W^*_{eq}$ should be applied to $y_{eq} = \Pi \cdot \tilde{y}$. Instead of scaling $\tilde{y}$ for every symbol, it is preferable to compute $\tilde{W}^* = W^*_{eq} \cdot \Pi$ once and apply $\tilde{W}^*$ directly to $\tilde{y}$. For MMSE-DFE, the successive cancellation is done using $\tilde{y}$ and $\tilde{H}$. No scaling is necessary.

Figure 11:
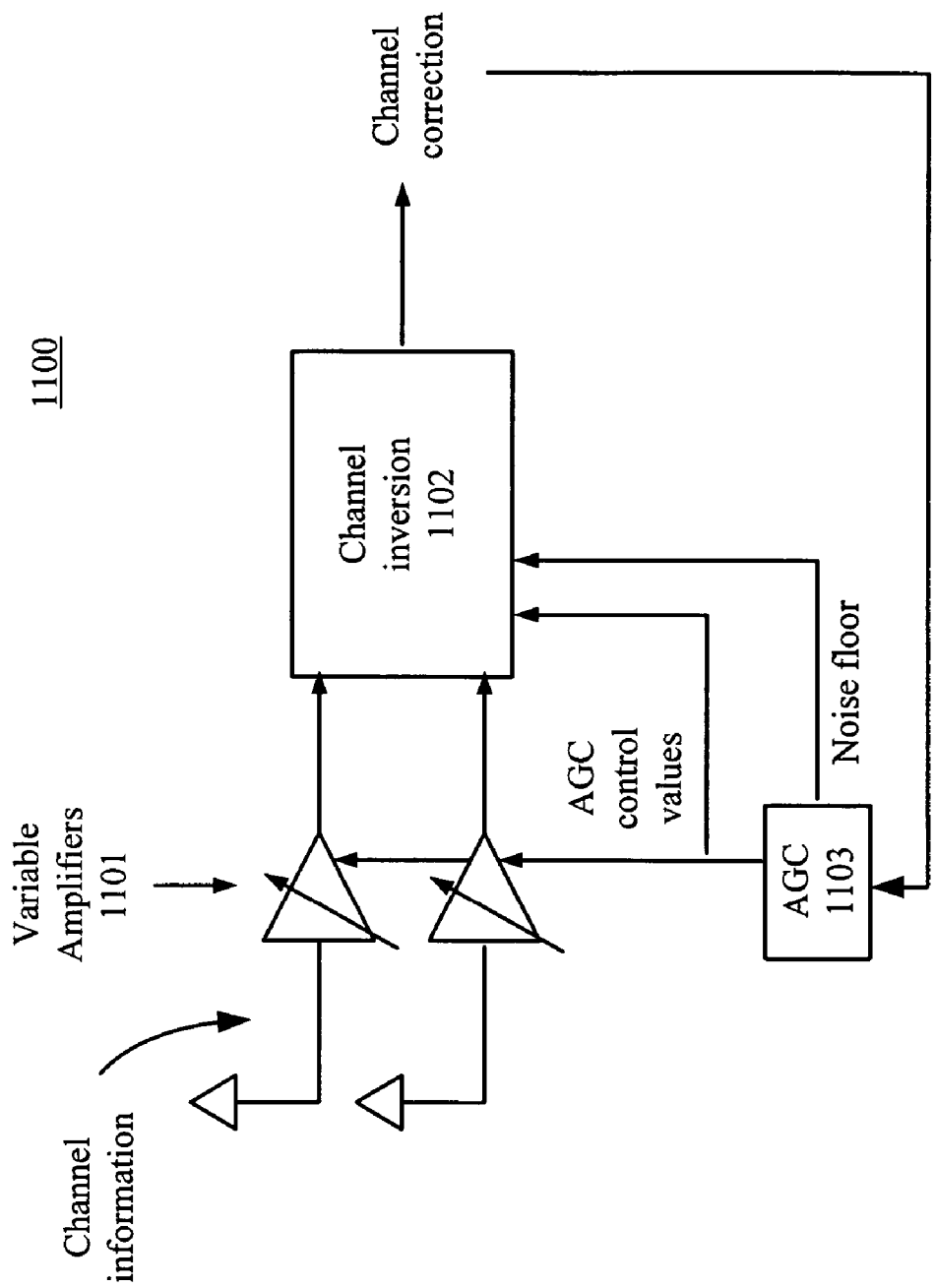
FIG. 11 illustrates a portion of an exemplary receiver that can modify channel correction for a plurality of receiver chains.

FIG. 11 illustrates a portion of a receiver 1100 that can modify channel correction for a plurality of receiver chains. In receiver 1100, variable gain amplifiers 1101 receive wireless signals (including associated channel information) from antennas and provide their amplified output to a channel inversion block 1102 for processing. An automatic gain control (AGC) block 1103 can generate some AGC control values for variable gain amplifiers 1101. Channel inversion block 1102 can receive these AGC control values as well as a noise floor (also generated by AGC block 1103 to compute an appropriate channel correction. This channel correction can be provided to AGC 1103 to tune the AGC control values.

Compensation for Phase Errors

Due to phase noise, residual frequency offset, induced phase errors, and/or Doppler changes in the channel between the transmitter and receiver, the phase of the effective channel matrix H will change slowly throughout a packet. To model these effects, the effective channel can be written as $\Lambda_r \cdot H \cdot \Lambda_t$, wherein $\Lambda_r = \text{diag}([e^{j\theta_r(1)} \ e^{j\theta_r(2)} \ldots e^{j\theta_r(N)}])$ and $\Lambda_t = \text{diag}([e^{j\theta_t(1)} \ e^{j\theta_t(2)} \ldots e^{j\theta_t(M)}])$ capture the phase changes at the N receive antennas and the M transmit antennas respectively. The corresponding equalization matrix is $\Lambda^*_t \cdot W^* \cdot \Lambda^*_r$, which can be easily modified when the phase estimations are available.

As described above, different pilot schemes can be used that allow joint, per transmit chain, or per transmit-receive pair pilot tracking. For joint pilot tracking, only one common phase offset is estimated for all transmit and receive chains, i.e. $\Lambda_t$ and $\Lambda_r$ collapse into a scalar $e^{j\theta}$. Modification to the equalization matrix is simply multiplication by scalar $e^{-j\theta}$.

For pilot tracking per transmit chain, one phase estimation per transmitted data stream can be estimated, i.e. $\Lambda_t$ and $\Lambda_r$ collapse into one $\Lambda_t$. Therefore, the equalization matrix can be modified into $\Lambda^*_t \cdot W^*$. If needed, the phase estimates can be averaged over the transmit chains to get one common phase and applied as a scalar. The average can be derived from mean of the angles, $$\theta = \frac{1}{M} \sum_m \theta_t(m),$$

or angle of the mean (equivalently, sum), $$\theta = \text{angle}\left(\sum_m e^{j\theta_t(m)}\right).$$

For pilot tracking per transmit-receive pair, the orthogonally combined and channel corrected pilots are first derived (see equation 4). In a first embodiment, the phase offset of each element of the channel matrix H, $\theta_{n,m}(1 \leq m \leq M, 1 \leq n \leq N)$ is estimated from these pilots and converted into $\theta_t(m)(1 \leq m \leq M)$ and $\theta_r(n)(1 \leq n \leq N)$. Note the following mapping:

$$\begin{bmatrix} 1_N & & & I_N \\ & 1_N & & I_N \\ & & \ddots & \vdots \\ & & & 1_N \ I_N \end{bmatrix} \begin{bmatrix} \theta_t(1) \\ \theta_t(2) \\ \vdots \\ \theta_t(M) \\ \theta_r \end{bmatrix} = \begin{bmatrix} \theta_1 \\ \theta_2 \\ \vdots \\ \theta_M \end{bmatrix} \Leftrightarrow A \cdot \Theta_1$$

$$= \Theta_2 \Rightarrow \Theta_1 = pinv(A) \cdot \Theta_2$$

wherein $1_N$ is the N-by-1 vector of all 1's, $I_N$ is the identity matrix of size N, $\theta_r = [\theta_r(1) \ \theta_r(2) \ldots \theta_r(N)]^T$ is vector of the phase at the N receivers, and $\theta_m = [\theta_{1,m} \ \theta_{2,m} \ldots \theta_{N,m}]^T$ is the phase vector of the m-th column of matrix H. The pseudo-inverse is the Least Square (LS) of the phase at the transmitter and receiver, which only depends on the number of transmit and receive antennas and therefore can be computed off-line.

Two implementation issues can be addressed here. First, the angles in $\Theta_2$ should not be allowed to wrap around $2\pi$ from symbol to symbol, as a change of $2\pi$ in $\Theta_2$ does not lead to a change of $2\pi$ in $\Theta_1$. To unwrap $\Theta_2$, the change in $\Theta_2$ between the current symbol and the previous symbol is adjusted to within $(-\pi, \pi)$ by adding or subtracting $2\pi$, and added to the previous $\Theta_2$.

Second, if some of the angles in $\Theta_2$ are unreliable (e.g. a weak component in the matrix channel), then the solution can also be unstable. The solution is to weight the components in $\Theta_2$ according to their reliability when forming the cost function and solve a weighted-LS problem, i.e. minimizing $\|\Gamma(A \cdot \Theta_1 - \Theta_2)\|^2 = \|\Gamma A \cdot \Theta_1 - \Gamma \Theta_2\|^2$ instead of $\|A \cdot \Theta_1 - \Theta_2\|^2$, where $\Gamma$ is a diagonal matrix with the weighting factors. The solution then becomes:

$$\Theta_1 = pinv(\Gamma A) \cdot \Gamma \Theta_2$$

Components with higher reliability should be weighted more, and lower reliability weighted less. One measurement of reliability is the magnitude of the channel components. The weights can be normalized by the maximum value, and if necessary, quantized to discrete levels for simplicity.

If needed, the estimated phase offsets of all transmit-receive antenna pairs can be averaged across the receive antennas to get one phase estimate per transmit antenna, $$\theta_t(m) = \frac{1}{N} \sum_n \theta_{n,m}$$

or averaged across all transmit and receive chains to get one common phase estimate $$\theta = \frac{1}{MN} \sum_{n,m} \theta_{n,m}.$$

In a second embodiment, $\theta_t$ and $\theta_r$ can be derived from combinations of the orthogonally combined and channel corrected pilots $v_{n,m,k}$ (see equation 4). The angle of the sum across pilot bins and receive antennas is the offset for each transmit antenna, $$\theta_t(m) = \text{angle}\left(\sum_{n,k} v_{n,m,k}\right).$$

The angle of the sum across transmit antennas is the offset for each receive antenna, $$\theta_r(n) = \text{angle}\left(\sum_{m,k} v_{n,m,k}\right).$$

The angle of the sum across all transmit and receive antennas, $$\theta = \text{angle}\left(\sum_{n,m,k} v_{n,m,k}\right),$$

is computed and half of that is subtracted from both transmit and receive offsets to remove the bias, $\theta_t(m) = \theta_t(m) - \theta/2$ and $\theta_r(n) = \theta_r(n) - \theta/2$.

If needed, only the offset for each transmit chain is computed and applied, $$\theta_t(m) = \text{angle}\left(\sum_{n,k} v_{n,m,k}\right).$$

Alternatively, only the common phase offset across all transmit and receive chains is computed and applied, $$\theta = \text{angle}\left(\sum_{n,m,k} v_{n,m,k}\right).$$

For continuous residual frequency offset correction, the common phase offset over all transmit and receive chains $\theta$ is used, because it captures the common phase shift due to residual frequency offset and suppresses fluctuations due to phase noise.

Closed Loop Transmit Optimization

If the MIMO transmitter has knowledge of the MIMO channel, it is possible to optimize the transmission scheme, including the number of data streams to transmit, the data rate to use for each stream, the sub-carriers to use for each stream, the selection of transmit antennas, the transmit power for each antenna, and so on. Such optimization improves the robustness and the throughput of MIMO systems.

Figure 1:
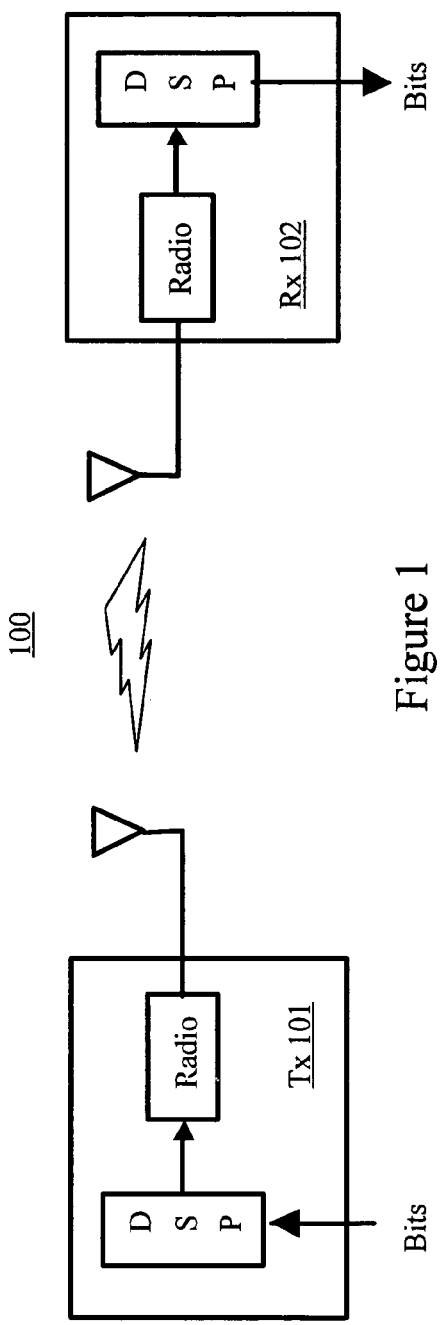
FIG. 1 illustrates a simplified system including a single input single output antenna configuration.
Figure 2:
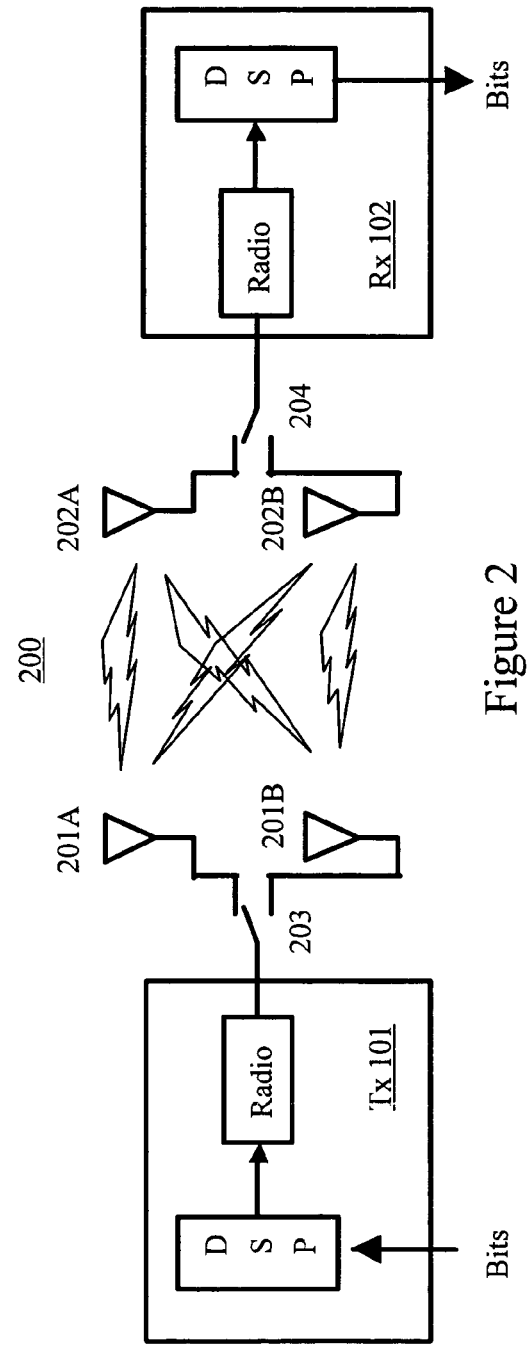
FIG. 2 illustrates a simplified system including a switched diversity antenna configuration.
Figure 3:
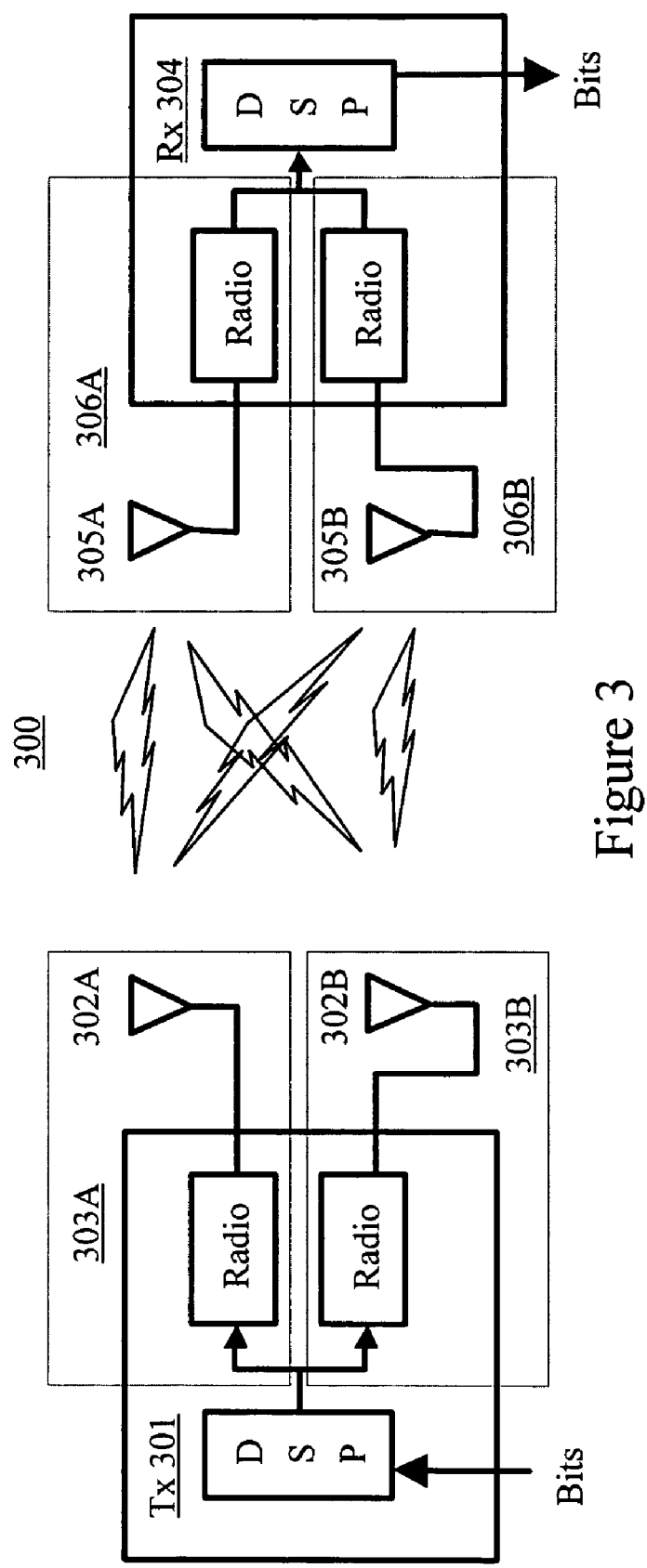
FIG. 3 illustrates a simplified multiple-input multiple-output (MIMO) system, which can transmit on multiple antennas simultaneously and receive on multiple antennas simultaneously.
Figure 4:
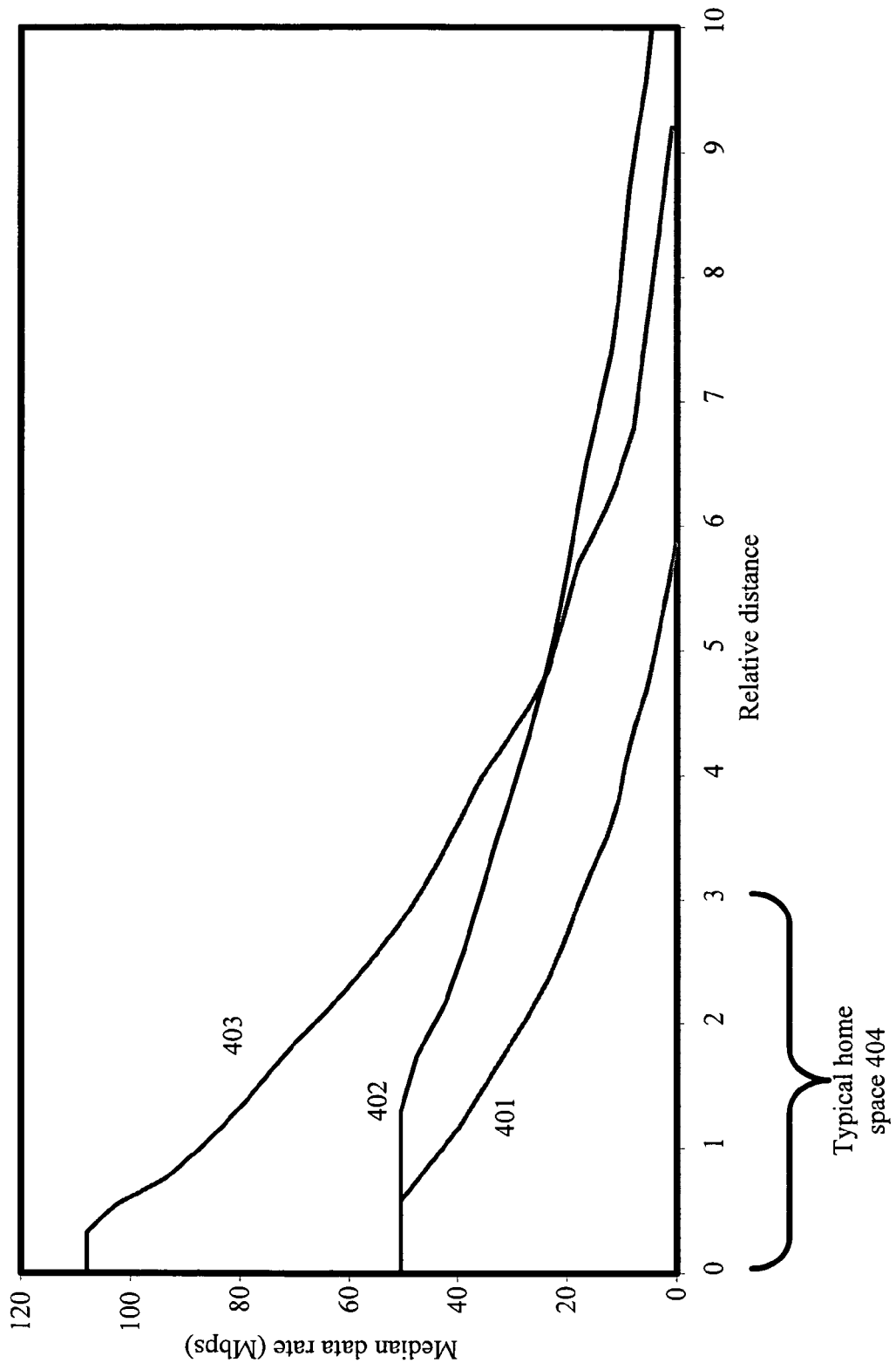
FIG. 4 illustrates the median data rates for various antenna configurations over relative distances.
Figure 5:
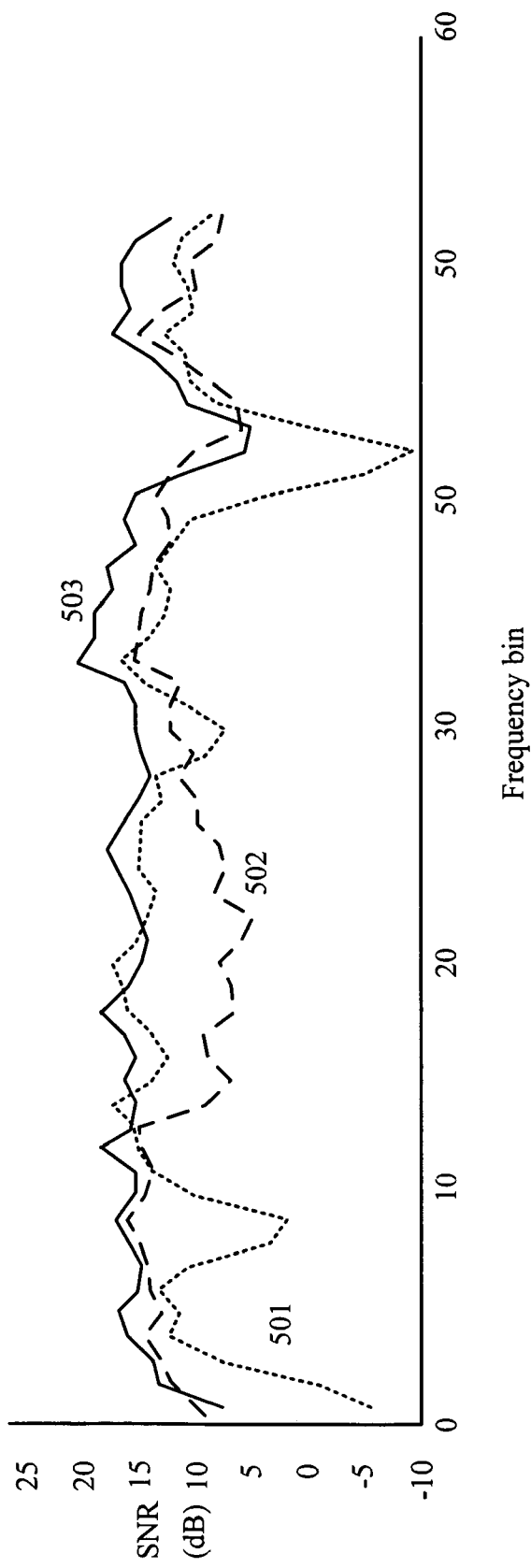
FIG. 5 illustrates the SNRs for various antennas across various frequency bins.

In a first embodiment and referring back to FIG. 3, receiver 304 can assess the quality of the channel and feeds the information back to transmitter 301. The information can be either in the format of channel information (e.g. channel estimates or a detection pilot EVM) or in the format of a recommended transmit scheme. Note that a detection pilot EVM can be computed from the channel corrected pilots and known clean pilots, and therefore can be a good measurement of the signal quality. Two different packets can be used to send back the channel information: the CTS packets in the standard RTS/CTS exchange and the ACK packets.

In a second embodiment, transmitter 301 can estimate the channel using packets received from receiver 304. Reciprocity is assumed for this scheme where the same antennas are used on both sides for uplink and downlink. Therefore, transmitter 301 can determine the best transmit scheme based on the estimated channel.

Note that more data streams can be supported in channels with high spatial dimension, and fewer can be supported in channels with low dimension. The optimal number of data streams to use is determined based on the dimension of the MIMO channel estimate. For systems without transmit diversity, the same number of transmit antenna with the best channel are chosen from all available transmit antennas.

For systems with transmit diversity, each data stream can be phase shifted properly and transmitted from multiple antennas simultaneously to form a merged beam (called transmit beam forming (TxBF)). The BF procedure for each data stream can be performed using the techniques described in U.S. patent application Ser. No. 10/682,381, entitled "Apparatus and Method of Multiple Antenna Transmitter Beamforming of High Data Rate . . . Signals", filed on Oct. 8, 2003, and U.S. patent application Ser. No. 10/682,787, entitled, "Apparatus and Method of Multiple Antenna Receiver Combining of High Data Rate Wideband Signals", filed on Oct. 8, 2003, both of which are incorporated by reference herein.

In general, different data streams are beam-formed toward the receive antennas to increase the receive SNR. This technique is particularly useful for the Access Point in systems with heavy downlink traffic. Transmit beam forming can be combined with high-rate MIMO by transmitting more than one but fewer than M unique data streams and using excess antennas to redundantly code and beam form the transmission in the intended direction.

In a discrete multi-tone (DMT) technique, the power and modulation type of each sub-carrier can be determined based on the channel estimates. Sub-carriers with good signal quality use more power and higher modulation levels than those with poor signal quality.

Receiver Selection Diversity

Due to cost and power consumption constraints, the number of receiver chains a MIMO receiver can have is usually limited. In contrast, the cost of RF antennas is much lower. It is therefore desirable to have more receive antennas than receiver chains and dynamically select the best receive antennas. This ability to dynamically select receive antennas yields diversity gain and improves the robustness of the system. To reduce the complexity and switching loss, in one embodiment, the RF antennas are divided into the same number of groups as the number of receiver chains. Each antenna group is connected to its corresponding receiver chain through a switch.

In a first embodiment, fast antenna diversity can be used. In fast antennas diversity, each receiver chain can quickly sample the signal strength on the RF antennas that are connected to it, and select the antenna that has the strongest signal.

In a second embodiment, the selection criterion is based on the detection SNR. Channel estimation can be done for all RF antennas. For each possible combination of receive antennas, the detection SNR can be computed for all transmitted data streams. The minimum SNR can then be compared across all possible antenna combinations. The set of antennas that gives the maximum minimum SNR can be selected.

Rate Adaptation

Rate adaptation for MIMO systems is more challenging than for legacy 802.11a/g systems. Specifically, either implicit feedback (exploiting reciprocity) or explicit feedback (where explicit messages are used) is needed to assess the quality of the channel from each of the transmitted antennas.

This feedback can have varying levels of detail. At the coarsest level, a single acknowledgement can be used to indicate that all data in all streams is correct. This could make even a scheme with the same rate for all streams difficult, because it would be difficult to determine the number of transmit streams that could be supported as well as which ones are most optimal.

The next level of feedback would be to individually acknowledge each data stream. This acknowledgement technique could allow for independent rate adaptation on each of the streams, though determining the optimal transmit antennas and the number of data streams supported could be difficult.

In yet another level of feedback, the intended receiver can perform channel measurements on the incoming packet during the channel estimation preambles and/or packet data portions. These estimates could determine the individual SNRs of each frequency/transmit antenna pair or could aggregate the information into bulk per-antenna values that could be used by the transmitter to adapt its rate. An intermediate solution is to just determine and report the SNR of a reduced set of frequency bins such as those of the pilot tone frequencies.

In one embodiment, the intended receiver can determine the best data rates that should be used based on its reception, and sends these data rates in the ACK to the transmitter. The transmitter decodes the ACK, retrieves the data rates, and applies these data rates to the next packet to that user. The information can include data rate information for each stream, or a single data rate and list of transmit antennas that can support it, or a single data rate and number of transmit antennas that can support it.

In another embodiment, the transmitter estimates the channel seen by the intended receiver from a special MIMO ACK sent by the intended receiver. To ensure reciprocity, the intended receiver will send the ACK using all the antennas it will receive with. This ACK only contains the legacy preamble and the MIMO preamble, without any data symbols. The transmitter can solicit for the special ACK when it needs to update the rate adaptation parameters or it could always use it. (Note that the statistics of lost packets can be used as an auxiliary means to adapt the data rates slowly.)

The rate adaptation information, particularly if in the form of an explicit data rate or set of data rates, must be aged either over time or over failed transmissions to allow the data rate to drop in the event of multiple failures due to changing channel conditions.

Aggregation, Multiple Checksums and Partial ACKs

A MIMO header significantly increases packet overhead. On the other hand, to transmit the same number of bytes of information, a MIMO packet usually requires many fewer data symbols. Therefore, the overall efficiency of MIMO packets is much lower than the efficiency of legacy packets of the same size.

In one embodiment, to preserve the benefit of the high data rate provided by MIMO data transmission systems, only packets with size greater than a minimum threshold will be transmitted in MIMO formats. Packet aggregation can be used to increase the packet size, where several smaller data packets are aggregated into one large "super" packet.

In 802.11a/g, a CRC checksum is added at the end of the packet and passed to the physical layer. The receiver MAC checks for CRC errors in the output of the Viterbi decoder to decide if the packet has been received correctly. In high rate MIMO systems, the number of data bytes in a packet is usually much greater to improve efficiency as previously described. The error probability of these long packets is usually higher, and so is the cost of re-transmitting these packets.

To overcome this problem, multiple checksums can be included in every MIMO packet using one of two methods. Using a first method, individual checksums are specified for each of the pre-aggregation packets. Using a second method, the post-aggregation super-packet can be divided into sections of equal length and checksums can be computed for each section and inserted after that section.

At the receiver (and after the decoder), the checksum can be examined for each packet/section to determine if that packet/section is received properly (e.g. using an acknowledgement bit-vector). If at least one packet/section is received correctly, then the receiver can send a partial ACK to the transmitter, indicating which of the packets/sections are received correctly. The transmitter will then only need to retry the failed packets/sections. To reduce MAC complexity, the MAC can choose to retransmit all sub-packets if any is in error. Note that the MAC could still use the individual bits in the acknowledgement bit-vector for rate adaptation purposes.

Although illustrative embodiments have been described in detail herein with reference to the accompanying figures, it is to be understood that the invention is not limited to those precise embodiments. They are not intended to be exhaustive or to limit the invention to the precise forms disclosed. As such, many modifications and variations will be apparent to practitioners skilled in this art.

Figure 12:
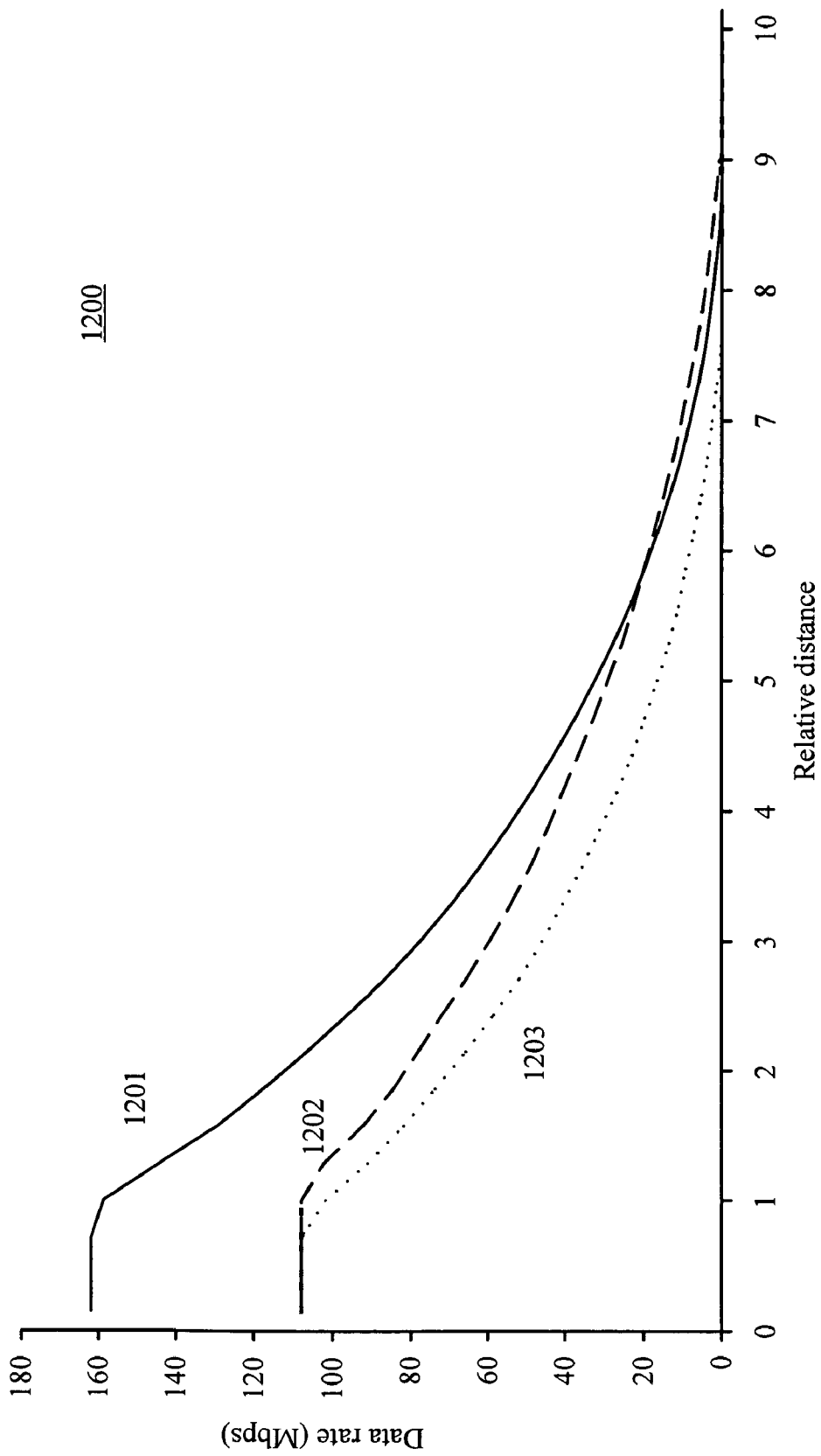
FIG. 12 illustrates the data rate of several transmitter/receiver antenna configurations over relative distances.

For example, FIG. 12 is a graph 1200 illustrating the data rate of several transmitter/receiver antenna configurations over relative distances. In graph 1200, line 1201 represents a 3 antenna transmitter and 3 antenna receiver configuration (3×3), line 1202 represents a 2×3 configuration, and line 1203 represents a 2×2 configuration. Note that a selected antenna configuration can be a compromise between a peak data rate and robustness. Thus, in one embodiment, the 2×3 configuration represented by line 1202 may be chosen based on economic considerations.

Note that a "turbo" mode can be added to MIMO-SM as well as MIMO-AG. This turbo mode refers to wider channel bandwidths and is described in U.S. patent application Ser. No. 10/367,527, entitled "Receiving and Transmitting Signals Having Multiple Modulation Types Using Sequencing Interpolator", filed on Feb. 14, 2003, as well as U.S. patent application Ser. No. 10/704,209, entitled "Multi-Channel Binding In Data Transmission", filed on Nov. 6, 2003, both incorporated by reference herein. In general a turbo mode can be achieved by (1) double clocking or (2) channel bonding, i.e. using two regular 20 MHz channels (and potentially the gap in between them) together. Double clocking leads to the same sub-carrier structure as normal mode, but each sub-carrier is twice as wide. Channel bonding maintains the width of each sub-carrier but increases the number of sub-carriers. One specific example of channel bonding is to use 114 tones, from −58 to −2, and +2 to +58 (wherein 3 tones near DC, (−1, 0, +1), are not used).

Note that all of the embodiments of the above-described MIMO systems are applicable to turbo mode.

Figure 13:
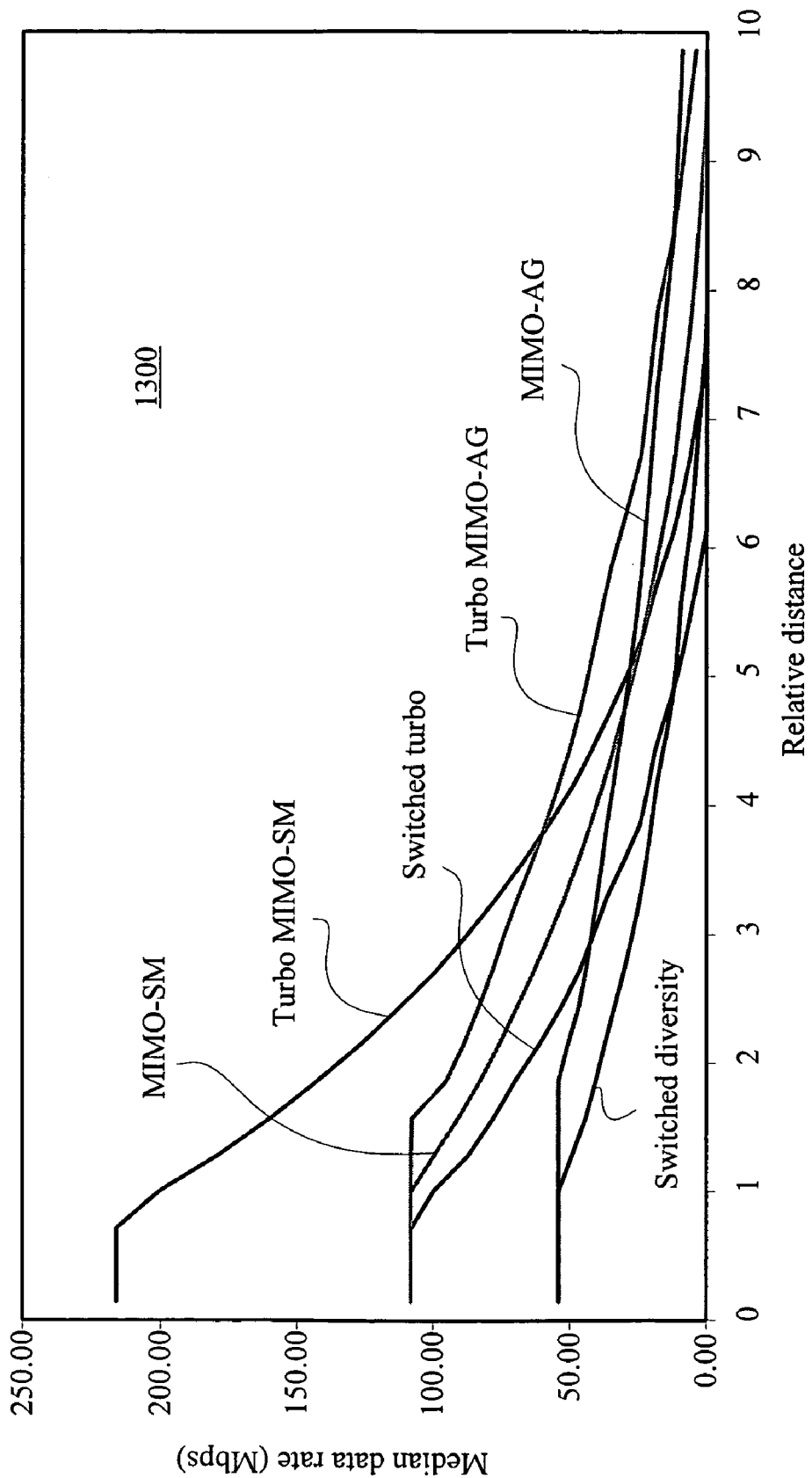
FIG. 13 illustrates the data rate of various turbo and non-turbo antenna configurations over relative distances.

FIG. 13 is a graph 1300 illustrating the data rate of several turbo and non-turbo antenna configurations over relative distances. As shown in graph 1300, turbo MIMO-SM delivers data rates up to 216 Mbps. However, turbo MIMO-AG can actually outperform MIMO-SM below 60 Mbps.

Accordingly, it is intended that the scope of the invention be defined by the following Claims and their equivalents.

The invention claimed is:

1. A method of sending a multiple-input multiple-output (MIMO) packet in a legacy device environment, the method comprising:
using a set of bits in a legacy SIGNAL symbol to indicate information associated with the MIMO packet, wherein the set of bits includes a plurality of least significant bits of a length field of the legacy SIGNAL symbol, and wherein the information includes a number of streams associated with the MIMO packet; and
transmitting the MIMO packet.

* * * * *